United States Patent
Ozaki et al.

(10) Patent No.: US 7,187,423 B2
(45) Date of Patent: Mar. 6, 2007

(54) DISPLAY AND METHOD FOR REPAIRING DEFECTS THEREOF

(75) Inventors: Kiyoshi Ozaki, Yonago (JP); Tsuyoshi Kamada, Yonago (JP); Kunio Matsubara, Yonago (JP); Shinya Katoh, Yonago (JP); Yoshihisa Taguchi, Kawasaki (JP); Katsushige Asada, Kawasaki (JP); Shogo Hayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/968,292

(22) Filed: Oct. 19, 2004

(65) Prior Publication Data

US 2005/0078235 A1  Apr. 14, 2005

Related U.S. Application Data

(62) Division of application No. 09/627,194, filed on Jul. 27, 2000, now Pat. No. 6,856,374.

(30) Foreign Application Priority Data

Nov. 19, 1999 (JP) ................................. 11-329804

(51) Int. Cl.
   *G02F 1/13* (2006.01)
   *G02F 1/1333* (2006.01)
   *G02F 1/1345* (2006.01)
   *G09G 3/36* (2006.01)
(52) U.S. Cl. .................... 349/54; 349/192; 349/149; 349/55; 345/104
(58) Field of Classification Search ............. 349/54, 349/192, 149; 345/104
   See application file for complete search history.

(56) References Cited

U.S. PATENT DOCUMENTS

| 4,752,118 A | 6/1988 | Johnson ................ 350/334 |
| 5,086,347 A | 2/1992 | Ukai et al. |
| 5,303,074 A * | 4/1994 | Salisbury ................ 349/55 |
| 5,459,410 A | 10/1995 | Henley ................ 324/770 |
| 5,600,460 A | 2/1997 | Yamamoto et al. |

(Continued)

FOREIGN PATENT DOCUMENTS

| JP | 5432978 | 3/1979 |
| JP | 02153324 | 6/1990 |
| JP | 03-1715512 | 7/1991 |

(Continued)

*Primary Examiner*—Andrew Schechter
*Assistant Examiner*—Hoan C. Nguyen
(74) *Attorney, Agent, or Firm*—Greer, Burns & Crain, Ltd.

(57) ABSTRACT

It is an object of the invention to provide a display and a method for repairing defects of the same in which defects such as inter-layer short-circuits and short-circuits in a single that have occurred at steps for manufacturing the display can be easily repaired to provide a good product with a probability higher than that in the related art. Laser irradiation is carried out as a first cycle of laser irradiation by forming a slit S1 in a region where a drain bus line 220 completely covers a gate bus line 218 to form a cut portion longer than the width of the gate bus line 218 adjacent to an inter-layer short-circuit 290 such that it splits an intersecting portion of the drain bus line 220 into two parts as shown in FIG. 5b. Next, as shown in FIG. 5c, slits S2 and S3 are respectively used for second and third cycles of laser irradiation to cut the drain bus line 220 at both ends of the cut portion (indicated by S1), thereby isolating the inter-layer short-circuit 290 of the drain bus line 220.

1 Claim, 28 Drawing Sheets

U.S. PATENT DOCUMENTS

| | | | |
|---|---|---|---|
| 5,995,178 A | 11/1999 | Fujikawa et al. | 349/55 |
| 6,239,856 B1 | 5/2001 | Imura et al. | |
| 6,271,600 B1 * | 8/2001 | Inada | 257/784 |
| 6,922,226 B2 * | 7/2005 | Park et al. | 349/149 |

FOREIGN PATENT DOCUMENTS

| | | |
|---|---|---|
| JP | 03171034 | 7/1991 |
| JP | 423453 | 1/1992 |
| JP | 5333373 | 12/1993 |
| JP | 06-337642 | 12/1994 |
| JP | 6337642 | 12/1994 |
| JP | 09090408 | 4/1997 |
| JP | 9113930 | 5/1997 |
| JP | 9325363 | 12/1997 |
| JP | 1138448 | 2/1999 |
| JP | 11163479 | 6/1999 |
| KR | 1997-13386 | 3/1997 |
| KR | 1998-59093 | 10/1998 |
| KR | 1999-41469 | 6/1999 |

\* cited by examiner

F I G. 14
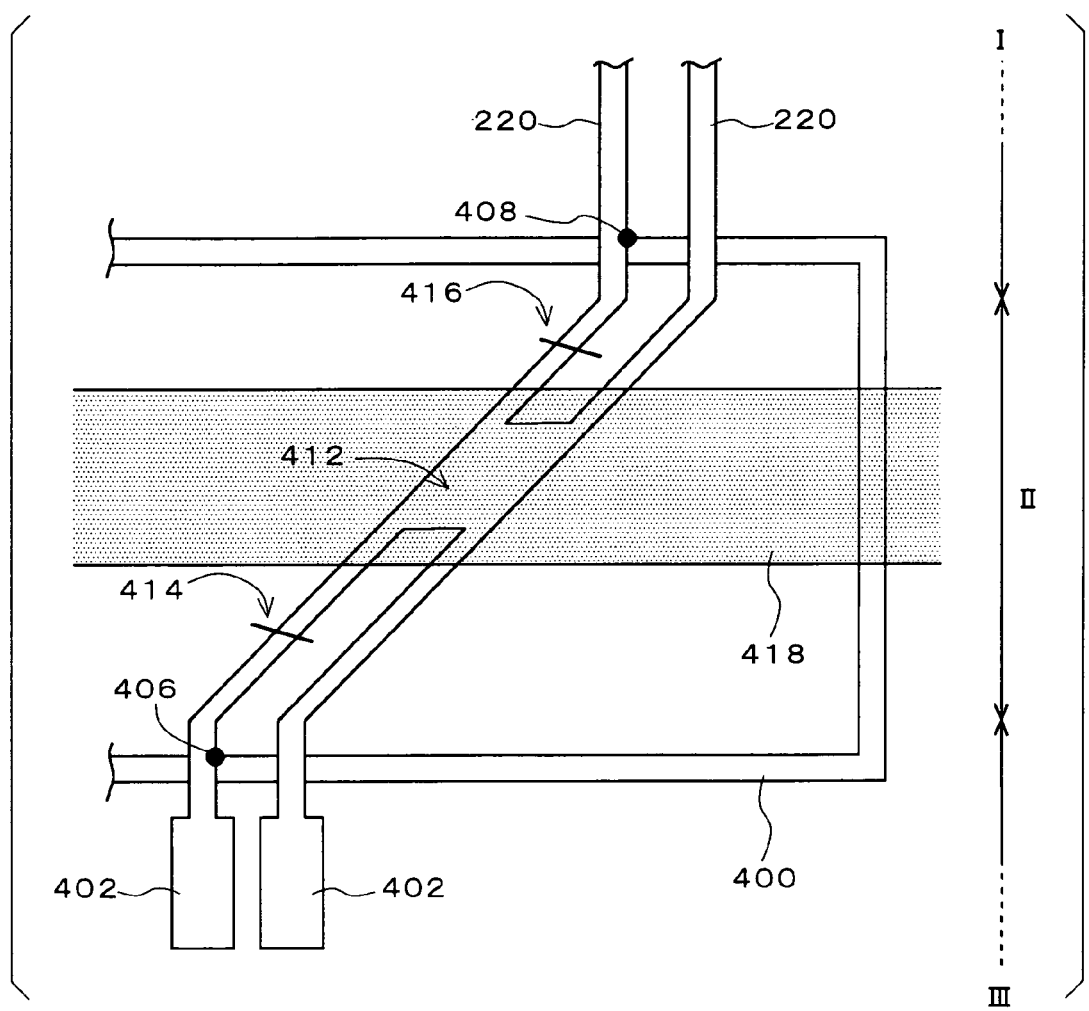

US 7,187,423 B2

DISPLAY AND METHOD FOR REPAIRING DEFECTS THEREOF

This is a divisional of application Ser. No.09/627,194, filed Jul. 27, 2000, now issued U.S. Pat. No. 6,856,374.

BACKGROUND OF THE INVENTION

1. Field of the Invention

The present invention relates to a display and a method for repairing defects thereof and, more particularly, to a liquid crystal display and a method for repairing defects thereof in which defects such as a short circuit between layers or a short circuit in a single layer that have occurred at steps for manufacturing the liquid crystal display are easily recovered (repaired) to provide a good product with a probability higher than that in the related art.

2. Description of the Related Art

FIG. 30 shows an example of a configuration of an active matrix liquid crystal display. The liquid crystal panel has a structure in which two glass substrates, i.e., a TFT substrate 200 formed with TFTs (thin film transistors) and the like and a CF substrate 2042 formed with a color filter (CF) and the like are in a face-to-face relationship with each other and are bonded together with liquid crystals 204 sealed therebetween.

FIG. 31 shows an equivalent circuit of elements formed on the TFT substrate 200. A plurality of gate bus lines 218 extending horizontally in FIG. 31 are formed on the TFT substrate 200, and a plurality of drain bus lines 220 extending vertically in FIG. 31 are formed in parallel with each other in an intersecting relationship with the gate bus lines. Each of the regions enclosed by the plurality of gate bus lines 218 and drain bus lines 220 serves as a pixel region. A TFT 222 and a display electrode 224 made of a transparent electrode material are formed in a pixel region. Each TFT 222 is connected to an adjacent drain bus line 220 at a drain electrode thereof, to an adjacent gate bus line 218 at a gate electrode thereof and to a display electrode 224 at a source electrode thereof. Storage capacitor bus lines 226 are formed on the substrate surface under the display electrodes 224 in parallel with the gate bus lines 218. The TFTs 222 and the bus lines 218, 220 and 226 are formed using a photolithographic step at which a series of semiconductor processes, i.e., film formation, resist application, exposure, development, etching and resist removal are repeated.

Referring again to FIG. 30, a gate driving circuit 206 loaded with driver ICs for driving the plurality of gate bus lines 218 and a drain driving circuit 208 loaded with driver ICs for driving the plurality of drain bus lines 220 are provided on the TFT substrate 200 which is provided in a face-to-face relationship with the CF substrate 2042 with the liquid crystals 204 sealed therebetween. Those driving circuits 206 and 208 output scan signals and data signals to predetermined gate bus lines 218 and drain bus lines 220 based on predetermined signals output by a control circuit 216. A polarizer 212 is provided on the surface of the TFT 200 opposite to the surface thereof on which the elements are formed, and a back-light unit 214 is attached to the surface of the polarizing plate 212 opposite to the TFT substrate 200. A polarizer 210 in a crossed Nicol relationship with the polarizer 212 is attached to the surface of the CF substrate 2042 opposite to the surface thereof on which the color filter is formed.

The structure of the TFT 222 may be an inverted staggered type in which source and drain electrodes are formed above a gate electrode on a substrate surface, a staggered type in which a gate electrode is formed above source and drain electrodes, a planar type or the like. FIGS. 32a, 32b and 32c show a schematic configuration of a pixel region having a typical inverted staggered type TFT. FIG. 32a is an illustration of the pixel region obtained by viewing the substrate surface from above, and FIG. 32b shows a section of the TFT taken along the line A—A in FIG. 32a. FIG. 32c shows a section of the region where the gate bus line 218 (or storage capacitor bus line 226) intersects the drain bus line taken along the line B—B in FIG. 32a.

As shown in FIGS. 32a, 32b and 32c, the TFT 222 is formed in the vicinity of the intersection between the gate bus line 218 and drain bus line 220. A drain electrode 230 of the TFT 222 is formed by being extended from the drain bus line 220. The edge portion of the drain electrode 230 is located at one edge of an active semiconductor layer 232 formed of amorphous silicon (a-Si) or polysilicon on the gate bus line 218 and a channel protection film 242 formed thereon.

On the other hand, a source electrode 228 is formed at the other edge of the active semiconductor layer 232 and channel protection film 242. In such a configuration, the region of the gate bus line 218 directly under the channel protection film 242 serves as a gate electrode of the TFT 222.

As shown in FIG. 32b, a gate insulation film 240 is formed on the gate bus line 218, and the active semiconductor layer 232 that constitutes a channel is formed on the gate insulation film 240 directly above the gate bus line 218. An auxiliary capacitor bus line 226 is also formed which horizontally extends substantially in the middle of the pixel region. A storage capacitor electrode 236 for each pixel is formed above the auxiliary capacitor bus line 226 with the insulation film 240 interposed therebetween. A pixel electrode 224 constituted by a transparent electrode is formed above the source electrode 228 and storage capacitor electrode 236. The pixel electrode 224 is electrically connected to the source electrode 228 through a contact hole 234 provided in a protective film 244 formed thereunder. The pixel electrode 224 is also electrically connected to the storage capacitor electrode 236 through a contact hole 238.

While the above-described TFT structure is of the inverted staggered type, for example, staggered type and planar type devices have an inverted structure in which a drain electrode is in the bottom layer and a gate electrode is located above the same. In any of those structures, what is to be noted is the fact that those metal layers are stacked in an intersecting relationship with each other with an insulation film interposed therebetween.

FIGS. 33a and 33b show a conventional method for repairing a short-circuit between metal layers caused by some reason. FIG. 33a is an illustration of a pixel region obtained by viewing the substrate surface from above, and FIG. 33b shows a section taken along the line A—A in FIG. 33a. FIG. 34 shows a repair line formed on a TFT substrate 200. Components having the same functions and operations as those of the components described with reference to FIGS. 30 through 32c are indicated by like reference numbers and will not be described here.

FIGS. 33a and 33b show a state in which the storage capacitor bus line 226 and drain bus line 220 penetrate through the gate insulation film 240 to cause an inter-later short-circuit 290. The inter-layer short-circuit 290 causes a line defect because it hinders the application of a predetermined voltage to the drain bus line 220. A repair is performed to repair the display defect using a laser.

According to this repairing method, first, the drain bus line 220 of the defective pixel is irradiated with a laser beam to be cut in a cutting position 300 between the drain electrode 230 and inter-layer short-circuit 290. Second, the drain bus line 220 is irradiated with a laser beam to be cut in a cutting position 301 between the inter-layer short-circuit 290 and the drain electrode 230 of the next pixel. This isolates the shorting position of the inter-layer short-circuit 290.

Third, as shown in FIG. 34, spare lines (repair lines) 302 and 303 provided in advance for a repair on the TFT substrate 200 are used to apply a predetermined voltage to the drain bus line 220 thus cut from the drain driving circuit 208.

A plurality of drain bus lines 220 formed in parallel at equal intervals in a display area I shown in FIG. 34 converge at an extraction wiring portion II to be connected to a TCP (tape carrier package) which is an FPC (flexible printed circuit) loaded with driver ICs mounted using TAB (tape automated bonding) at a terminal portion III.

The repair line 302 is formed such that it intersects the plurality of drain bus lines 220 with the insulation film interposed at the end of the display area I on the side of the drain driving circuit 208 and is extended along with the plurality of drain bus lines 220 through the extraction wiring portion II to be connected to the TCP at the terminal portion III. The repair line 302 is formed of the same metal as used to form the gate bus lines 218 and is normally insulated from the drain bus lines 220 by the insulation film 240.

When a defect attributable to an inter-layer short-circuit 290 occurs at a certain drain bus line 220, a region 304 where the drain bus line 220 and the repair line 302 intersect with each other is irradiated with a laser beam to fuse those wiring metals together, which establishes connection and conduction. Referring to conditions for the laser irradiation at such a repair, the laser must have intensity as shown in FIG. 1d which will be described later.

The repair line 302 extends from the gate driving circuit 206 through the printed circuit board 250 to the repair line 303 on the unloaded side of the driving circuit. The repair line 303 on the unloaded side of the driving circuit is also formed of the same metal as used for the formation of the gate bus lines 218 and is formed such that it intersects the plurality of drain bus lines 220 with the insulation film 240 interposed therebetween. During a repair, a region 304 where a drain bus line 220 having an inter-layer short-circuit 290 and the repair line 302 intersect with each other is irradiated with a laser beam, and a region 305 where the drain bus line 220 and the repair line 303 intersect with each other is also irradiated with a laser beam to fuse both of the lines, which establishes connection and conduction. Thus, a predetermined voltage is applied to the drain bus line 220 from which the shorting portion of the inter-layer short-circuit 290 has been cut off also from the side opposite to the drain driving circuit 208 to perform a repair for preventing the occurrence of the line defect.

The number of the repair lines 302 and 303 determines the number of defects that can be relieved among a plurality of defects that have occurred in one panel. In view of demands for panels with smaller frames in these days, however, it is not preferable to increase the repair lines 302 and 303 because the area of the substrate occupied by the repair lines 302 and 303 is increased. Further, since an extra capacitor is generated at the regions where the repair lines 302 and 303 intersect the drain bus lines 220, the drain driving circuit 208 has an increased load, and this is another factor that discourages the increase of the repair lines. For example, even if two repair lines are provided in a panel, inter-later short-circuits at three or more drain bus lines disable a complete repair, and this results in a defective panel. Repair lines are frequently required not only for inter-layer short-circuits but also for breakage of drain bus lines 220 and short-circuits in a single layer, and those defects can render a panel defective when they occur in combination even if there is only one drain bus line that has an inter-layer short-circuit.

A repair utilizing laser irradiation does not necessarily result in successful connection with a probability of 100%. The optimization of laser conditions can only provides a probability in the range from 60 to 80%, although it depends on the metal materials used. The probability can only be improved up to about 90% even if the number of locations to be irradiated with a laser beam is increased and, accordingly, defective panels are produced in a probability of 10%.

A repair of connection according to the related art utilizing laser irradiation involves irradiation of a multiplicity of locations in a panel with a laser beam even if there is an inter-layer short-circuit in only one location, which has resulted in a problem in that the repair becomes very much complicated and induces operational errors such as misaddressing a location to be irradiated with a laser beam.

As described above, according to the related art, repair lines 302 and 303 are provided on an assumption that a line breakage or the like exists in a display area I as shown in FIG. 34. Recent demands for panels with smaller frames have increased the possibility of defects such as breakage and shorting of a lines because such demands have necessitated a smaller line width and a smaller line interval at an extraction wiring portion II. This has resulted in a need for a repairing method which can cope with defects at an extraction wiring portion II.

SUMMARY OF THE INVENTION

It is an object of the invention to provide a display and a method for repairing defects of the same in which defects such as an inter-layer short-circuit and a short-circuit in a single layer that have occurred at steps for manufacturing the display can be easily repaired to provide a good product with a probability higher than that in the related art.

The above-described object is achieved by a method for repairing defects of a display having pixel regions formed on a substrate, comprising the steps of irradiating a multi-layer region formed by stacking a plurality of conductive layers with insulation layers interposed with a laser beam and selectively removing only an upper conductive layer in the vicinity of the multi-layer region such that neither inter-layer short-circuit nor short-circuit in a single layer occurs in the multi-layer region.

The present invention makes it possible to repair an inter-layer short-circuit using no repair line. By optimizing the output power of a laser, it is possible to melt or vaporize only either of stacked metals or to melt and vaporize both of them such that they are not fused and connected.

BRIEF DESCRIPTION OF THE DRAWINGS

FIG. 14 schematically illustrates another modification of the first embodiment of a method for repairing a defect in a display in the third mode for carrying out the invention.

DETAILED DESCRIPTION OF THE PREFERRED EMBODIMENTS

A description will now be made of a method for repairing a defect in a display according to a first mode for carrying out the invention with reference to FIGS. 1a through 7d. First, the method for repairing a defect according to the present mode for carrying out the invention will be schematically described with reference to FIGS. 1a through 2. Components having the same functions and operations of those according to the related art shown in FIGS. 30 through 33b will be indicated by like reference numbers and will not be described here.

Figure 1A:
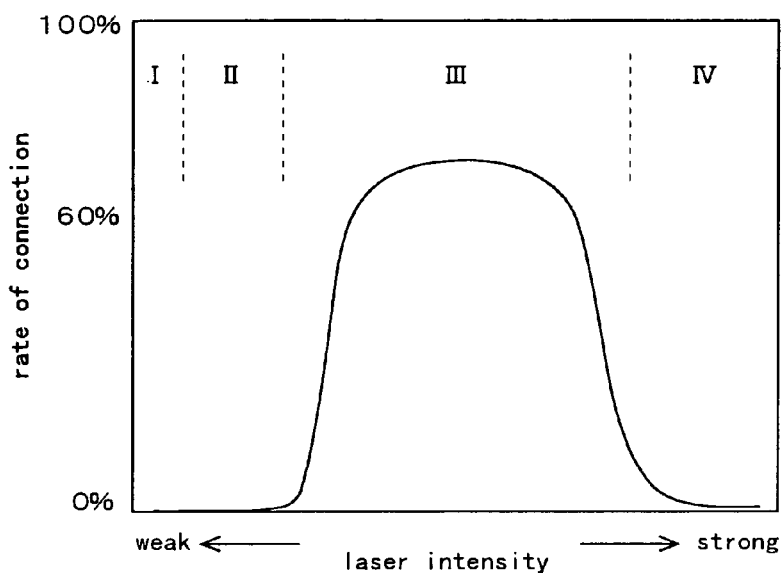
FIGS. 1a through 1e illustrate a method for repairing a defect in a display according to a first mode for carrying out the invention.

FIGS. 1a through 1e show the relationship between the output intensity of YAG laser used for a repair and states of two metal layers vertically stacked with an insulation film interposed therebetween. FIG. 1a is a graph whose abscissa axis represents the output intensity of the laser and whose ordinate axis represents the rate of connection between the two metal layers. The output intensity of the laser is divided into four stages or ranges I through IV based on the rate of connection between the two metal layers. FIGS. 1b through 1e are sectional views of the substrate showing states of the two metal regions in the respective four stages or ranges I through IV of the output intensity of the laser divided based on the graph of FIG. 1a.

In the substrate to be repaired shown in FIGS. 1b through 1e, gate bus lines 218 (or storage capacitor bus lines 226) are formed as a first metal layer (conductive layer) on a TFT substrate 200 constituted by a 0.7 mm thick glass substrate, and a gate insulation film 240 is formed on the same. The first metal layer is formed by a 100 nm thick aluminum (Al)

layer and a 50 nm thick titanium (Ti) layer stacked on the same. The gate insulation film 240 is constituted by a silicon nitride film (SiN) having a thickness of 350 nm.

Drain bus lines 220 as a second metal layer (conductive layer) intersecting the first metal layer are formed on the gate insulation film 240, and a protective film 244 is formed on the entire upper surface of the substrate. The second metal layer is formed by a 20 nm thick Ti layer, a 75 nm thick Al layer and a 80 nm thick Ti layer stacked in the same order. The protective film 244 is constituted by SiN with a thickness of 330 nm.

Figure 1B:
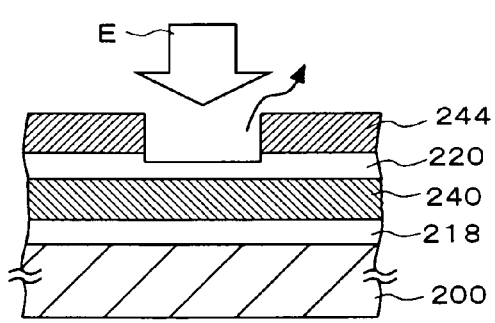

FIG. 1*b* shows a state of the surface of the TFT substrate 200 when irradiated with a laser beam E with low intensity within the range I in the graph of FIG. 1*a*. In the range I where the laser output is quite weak, since the second metal layer that is the upper layer can not be sufficiently melted, only a part of the upper layer of the second metal layer is vaporized and the second metal layer can not be cut and isolated.

Figure 1C:
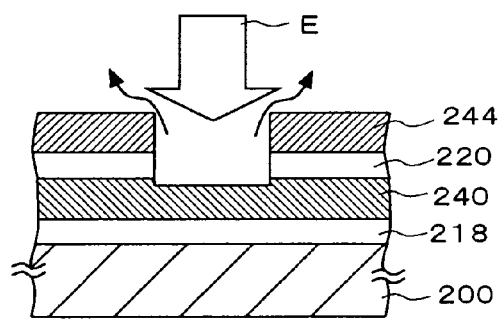

FIG. 1*c* shows a state of the surface of the TFT substrate 200 when irradiated with a laser beam E within the range II having intensity slightly higher than that in the range I in the graph of FIG. 1*a*. In the range II, only the second metal layer which is the upper layer can be melted and vaporized to be cut and isolated. Since the irradiation energy of the laser beam E is consumed only in breaking the second metal layer, it has no influence on the underlying gate insulation film 240 and first metal layer (218, 226) whose state therefore undergoes no change.

Figure 1D:
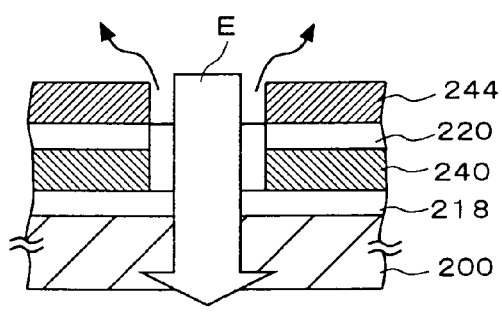

FIG. 1*d* shows a state of the surface of the TFT substrate 200 when irradiated with a laser beam E within the range III having intensity higher than that in the range II in the graph of FIG. 1*a*. In the range III, not only the upper second metal layer but also the lower first metal layer is melted and vaporized, and those metals partially contact again and mix each other. Therefore, the first and second metal layers are likely to be connected with each other.

Figure 1E:
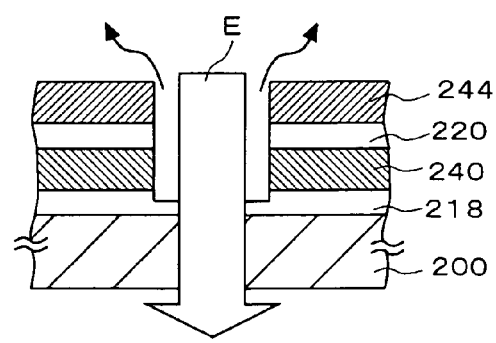

FIG. 1*e* shows a state of the surface of the TFT substrate 200 when irradiated with a laser beam E within the range IV having intensity higher than that in the range III in the graph of FIG. 1*a*. In the range IV where the laser output is further enhanced, while both of the first and second metal layers are melted and vaporized, the probability of connection between the first and second metal layers is decreased because vaporization occurs at a higher rate because of the increased irradiation energy.

Figure 2:
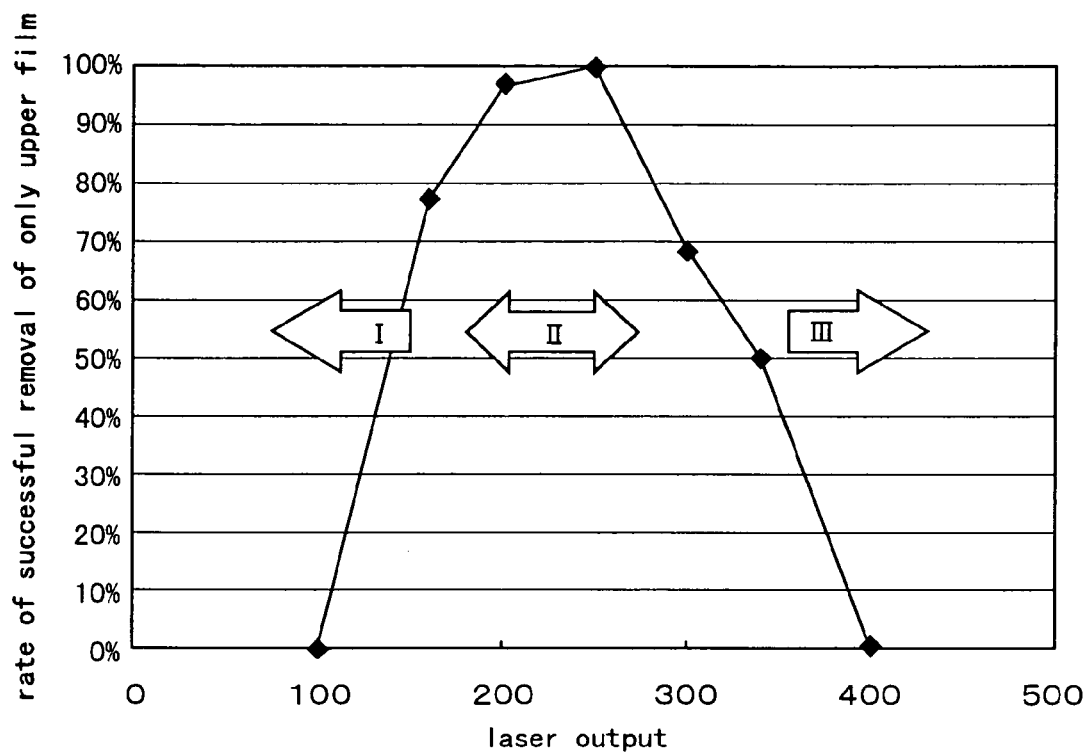
FIG. 2 illustrates the method for repairing a defect in a display according to the first mode for carrying out the invention.

The present mode for carrying out the invention is characterized in that a repair of a defect is carried out by means of laser irradiation using the range II or IV among the above-described ranges I through IV of the intensity of a laser beam. In practice, the laser output value significantly varies depending on the metals to be irradiated and the material, quality, thickness and shape of the insulation film and, therefore, the laser output value can not be limited to any general range of numerical values. However, a normal laser repairing apparatus may be used in such a range II or IV on a TFT substrate which is a combination of common materials. FIG. 2 is a graph whose ordinate axis represents the rate (%) of successful removal of only an upper metal of a TFT substrate and whose abscissa axis represents the output (relative values) of the laser. According to an experiment in which a low laser output resulting in successful removal, i.e., successful cutting of the upper layer metal at a rate of 0% is represented by 100, laser outputs with relative values of 160, 205 and 250 result in rates of successful removal of 78%, 96% and 100%, respectively. When the laser output is further increased to relative values of 295, 340 and 440, the rate of successful removal decreases to 69.2%, 50% and 0%, respectively. This indicates that the range of the laser output with relative values lower than 160, the range with relative values higher than 295 and the range with relative values between 160 and 295 inclusive can be used as the ranges I, III and II, respectively.

Figure 3A:
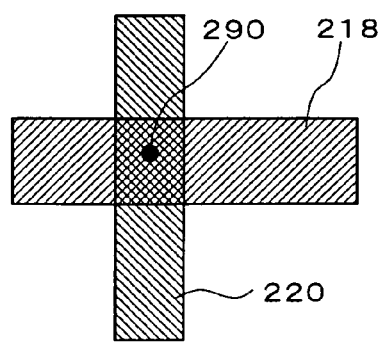
FIGS. 3a and 3b illustrate an example in which an inter-layer short-circuit is repaired by performing irradiation with a laser using a range IV according to the method for repairing a defect in a display in the first mode for carrying out the invention.
Figure 3B:
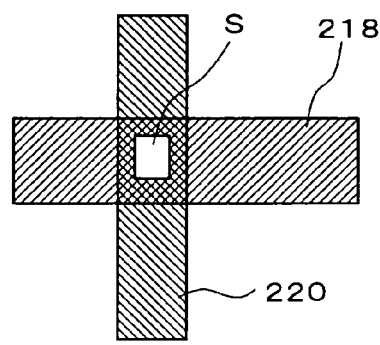

A description will now be made with reference to FIGS. 3*a* and 3*b* on an example in which an inter-layer short-circuit is repaired by performing irradiation with a laser using the range IV. FIG. 3*a* shows a state of the surface of the TFT substrate 200 in which there is an inter-layer short-circuit 290 substantially in the middle of an intersection between a gate bus line 218 and a drain bus line 220. In this case, the inter-layer short-circuit 290 is irradiated with a laser beam having output intensity within the range IV. In doing so, the laser beam is projected through a slit S for limiting the beam within a region to be irradiated that encloses only the inter-layer short-circuit 290 in order not to break the drain bus line 220 and gate bus line 218. While the drain bus line 220 and gate bus line 218 are connected when the intensity of the laser beam is low and is actually at the level of the range III, the connection can be broken with an increased probability by performing irradiation again with the slit S adjusted to enlarge the irradiated region slightly. Further, the repair can be performed reliably and easily by repeating the irradiation with a laser beam until the resistance of the short-circuit sufficiently increases while measuring the resistance using a tester or the like. FIG. 3*b* shows a state realized after the inter-layer short-circuit 290 is repaired. The inter-layer short-circuit 290 has been eliminated and replaced by a hole having a configuration substantially the same as the slit S which extends to the surface of the glass substrate, and no short-circuit has occurred between the drain bus line 220 and gate bus line 218.

Figure 4A:
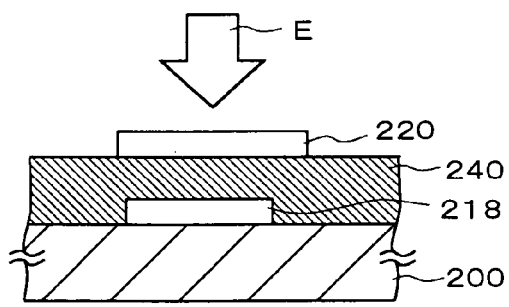
FIGS. 4a through 4d illustrate an example in which an inter-layer short-circuit is repaired by performing irradiation with a laser using a range II according to the method for repairing a defect in a display in the first mode for carrying out the invention.
Figure 4B:
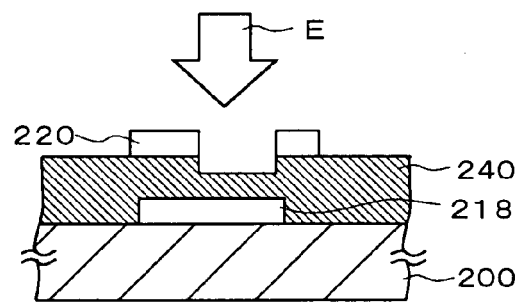
Figure 4C:
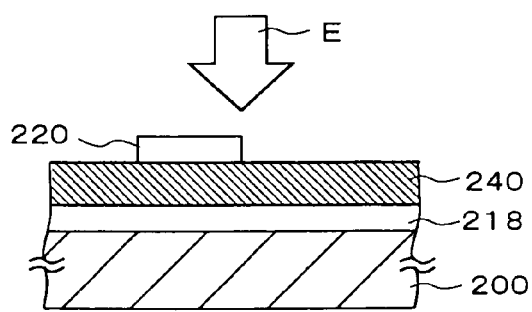
Figure 4D:
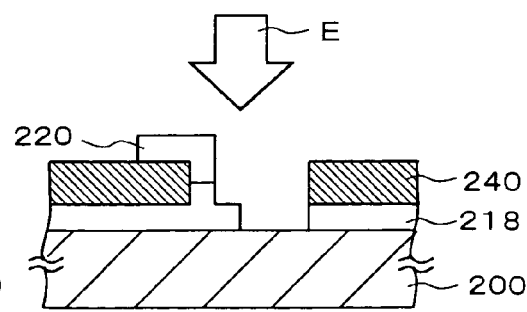

A description will now be made with reference to FIGS. 4*a* through 4*d* and FIGS. 5*a* through 5*c* on an example in which an inter-layer short-circuit is repaired by performing irradiation with a laser using the range II. FIGS. 4*a* through 4*d* are sectional views of the TFT substrate 200 showing states in which a gate bus line 218 is formed on the TFT substrate 200 and in which a drain bus line 220 intersects the same with a gate insulation film 240 interposed therebetween. FIGS. 4*a* and 4*b* show proper laser irradiation using the range II according to the present mode for carrying out the invention, and FIGS. 4*c* and 4*d* show an example of improper laser irradiation which is not in accordance with the present mode for carrying out the invention.

In FIG. 4*a*, a region where the drain bus line 220 completely covers the gate bus line 218 is irradiated with a laser beam E having intensity within the range II. As shown in FIG. 4*b*, this prevents the laser beam E from directly irradiating the gate bus line 218 and thus makes it possible to melt and vaporize only the drain bus line 220.

In FIG. 4*c*, both of the drain bus line 220 and gate bus line 218 are irradiated with the laser beam E having intensity within the range II. In this case, the gate bus line 218 is also irradiated with the laser beam E and, therefore, not only the drain bus line 220 but also the gate bus line 218 is melted and vaporized. This can result in a short-circuit between the drain bus line 220 and gate bus line 218 as shown in FIG. 4*d*.

Figure 5A:
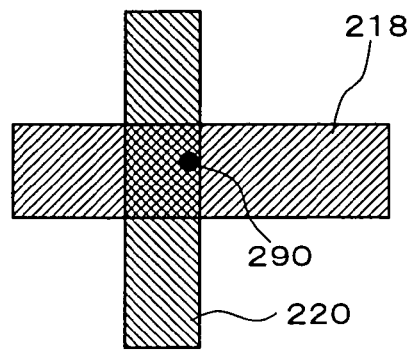
FIGS. 5a through 5c illustrate an example in which an inter-layer short-circuit is repaired by performing irradiation with a laser using a range II according to the method for repairing a defect in a display in the first mode for carrying out the invention.
Figure 5B:
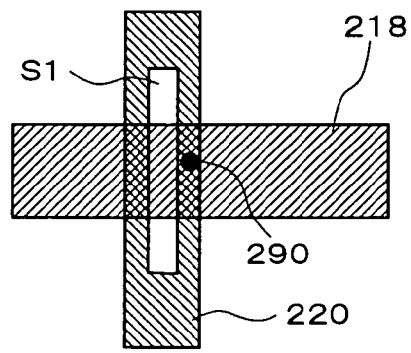
Figure 5C:
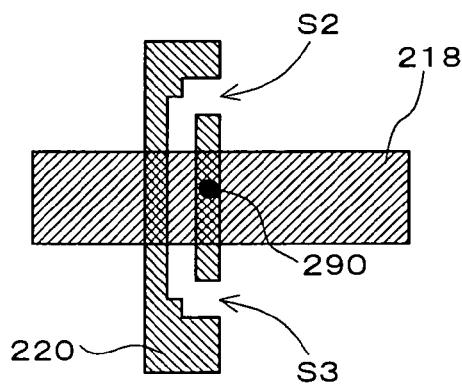

A description will now be made with reference to FIGS. 5*a* through 5*c* on an example in which an inter-layer short-circuit is repaired by performing irradiation with a laser using the range II. FIG. 5*a* shows a state of the surface of the TFT substrate 200 in which there is an inter-layer short-circuit 290 in the vicinity of an edge of a drain bus line 220 at an intersection between a gate bus line 218 and the drain bus line 220.

A laser beam irradiation apparatus for a repair according to the related art can irradiate an object by adjusting a slit S having a rectangular irradiating area to change the size of the irradiating area. Therefore, as described with reference to FIGS. 4a through 4d, laser irradiation having an output within the range II is carried out as a first cycle of laser irradiation by forming a slit S1 in a region where the drain bus line 220 completely covers the gate bus line 218. As a result of this laser irradiation, a cut portion longer than the width of the gate bus line 218 is formed adjacent to the inter-layer short-circuit 290 such that it splits the intersecting portion of the drain bus line 220 into two parts, as shown in FIG. 5b. Next, as shown in FIG. 5c, slits S2 and S3 are respectively used for second and third cycles of laser irradiation with an output within the range II to cut the drain bus line 220 at both ends of the cut portion (indicated by S1), thereby isolating the inter-layer short-circuit 290 of the drain bus line 220. The order of laser irradiation may be the reverse of that described above.

Figure 6A:
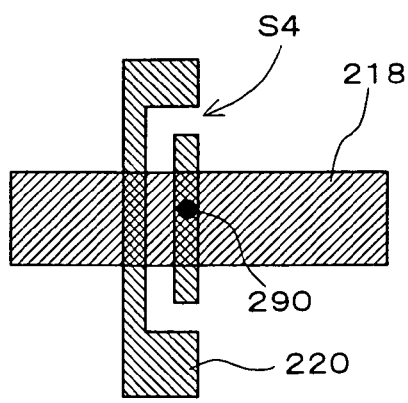
FIGS. 6a and 6b illustrate a modification of the example of a repair of an inter-layer short-circuit by performing irradiation with a laser using a range II according to the method for repairing a defect in a display in the first mode for carrying out the invention.
Figure 6B:
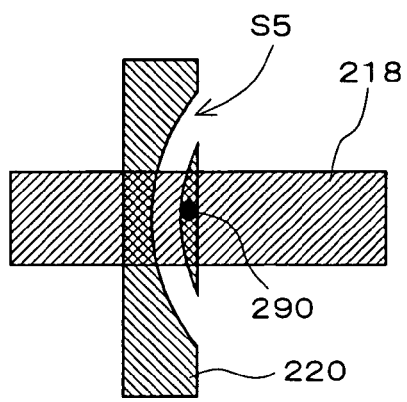

As shown in FIGS. 6a and 6b, the use of a U-shaped slit (see S4 in FIG. 6a), an arcuate slit (see S5 in FIG. 6b) or the like will make it possible to complete a repair of a defect in one cycle of laser beam irradiation.

Figure 7A:
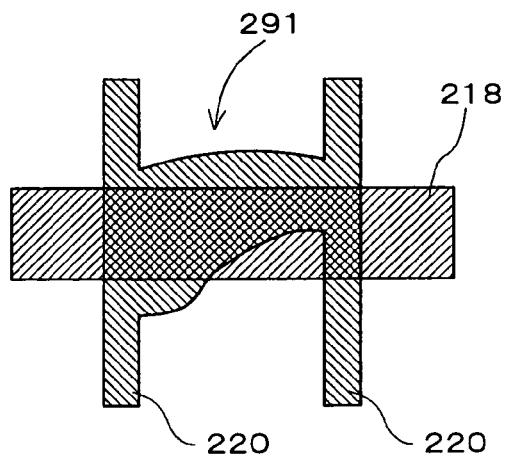
FIGS. 7a through 7d illustrate an example in which a short-circuit in a single layer is repaired by performing irradiation with a laser using a range II according to the method for repairing a defect in a display in the first mode for carrying out the invention.
Figure 7B:
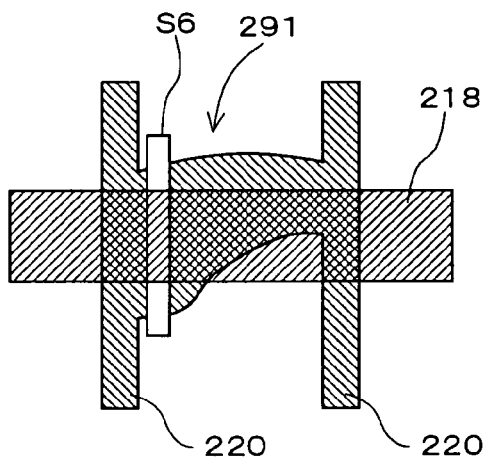

A description will now be made with reference to FIGS. 7a through 7d on examples in which a short-circuit in a single layer is repaired by performing irradiation with a laser using the range II. FIG. 7a shows a state of the surface of the TFT substrate 200 in which there is a short-circuit 291 between two drain bus lines 220 in the same layer in the vicinity of intersections between a gate bus line 218 and the drain bus lines 220. In the example shown in FIG. 7a, the short-circuit 291 in the same layer completely covers the gate bus line 218 in the vicinity of the region thereof connected to the drain bus line 220 on the left side. Therefore, a slit S is focused on the same region, and laser irradiation having an output within range II is performed with the shape of the slit S adjusted such that the short-circuit 291 in the same layer is cut along the drain bus line 220. As shown in FIG. 7b, this laser irradiation makes it possible to break the short-circuit 291 in the same layer in the region of a slit S6, thereby eliminating the short-circuit between the two drain bus lines 220 without irradiating the gate bus line 218 in the underlying layer with a laser beam.

Figure 7C:
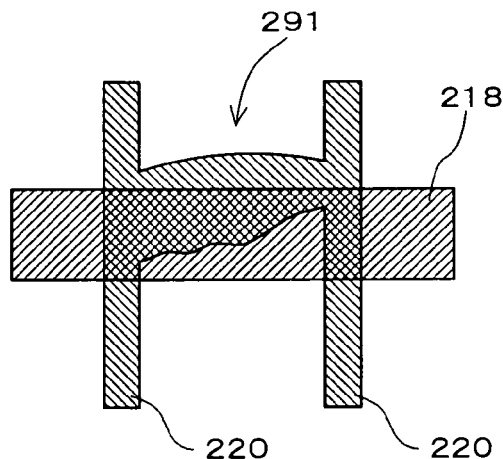
Figure 7D:
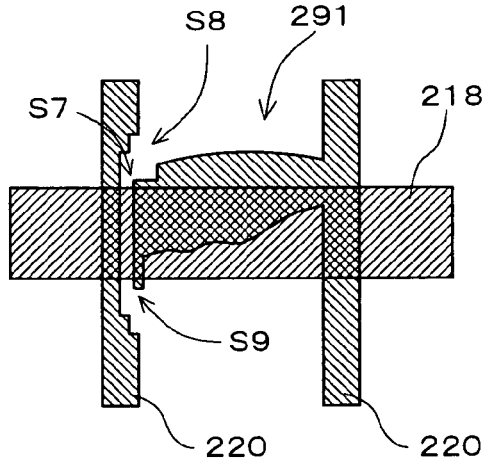

Similarly to FIG. 7a, FIG. 7c shows a state of the surface of the TFT substrate 200 in which there is a short-circuit 291 in a single layer between two drain bus lines 220 in the vicinity of intersections between a gate bus line 218 and the drain bus lines 220. In the example shown in FIG. 7c, however, the short-circuit 291 in the single layer has no region which completely covers the gate bus line 218. In this case, similarly to the example described with reference to FIGS. 5a through 5c, laser irradiation with an output within the range II is performed as a first cycle of laser irradiation by forming a slit S7 in a region on the left drain bus line 220 which completely covers the gate bus line 218. As a result of this laser irradiation, a cut portion S7 longer than the width of the gate bus line 218 is formed such that it splits the intersecting portion of the left drain bus line 220 into two parts, as shown in FIG. 7b. Next, slits S8 and S9 are respectively used for second and third cycles of laser irradiation with an output within the range II to cut the drain bus line 220 at both ends of the cut portion S7. This makes it possible to isolate the short-circuit 291 in the single layer from the left drain bus line 220, thereby eliminating the short-circuit between the two drain bus lines 220 without irradiating the gate bus line 218 in the underlying layer with a laser beam. Obviously, the order of laser irradiation may be the reverse of that described above.

The above-described repairing method in the present mode for carrying out the invention may be used in combination with a repairing method according to the related art in which repair lines are formed on a substrate. In this case, satisfactory effects can be achieved even if the present mode for carrying out the invention is not 100% successful. For example, when inter-layer short-circuits are present in three locations of a panel formed with two repair lines to allow up to two locations to be repaired, the repairing method in the present mode may be used for the three locations and, if only one of the locations is successfully repaired, the remaining two locations can be repaired using the repairing method according to the related art in which the drain bus lines 220 are cut and connected to the repair lines. Further, the present mode for carrying out the invention allows easier operations and induces less errors compared to the conventional repairing method that involves line connection because it only involves irradiation of defective parts with a laser beam. This makes it possible to repair defects such as inter-layer short-circuits and short-circuits in a single layer easily with a probability higher that in the related art.

A description will now be made with reference to FIGS. 8 through 10 on a method for repairing a defect in a display according to a second mode for carrying out the invention. In the present mode for carrying out the invention, a method for repairing a breakage in a gate bus line will be described. Components having the same functions and operations as those in the first mode for carrying out the invention will be indicated by like reference numbers and will not be described.

The present mode for carrying out the invention is characterized in that a bypass for a broken portion 292 of a gate bus line 218 is formed by separating or connecting it from or to a drain electrode 230 or a source electrode 228 of a TFT or a pixel electrode 224 or a storage capacitor bus line 226 which is formed above the gate bus line 218 with an insulation film 240 interposed through local irradiation with a laser beam, thereby allowing the broken portion 292 of the gate bus line 218 to be repaired.

The invention will now be described with reference to specific embodiments.

A first embodiment will now be described.

Figure 8:
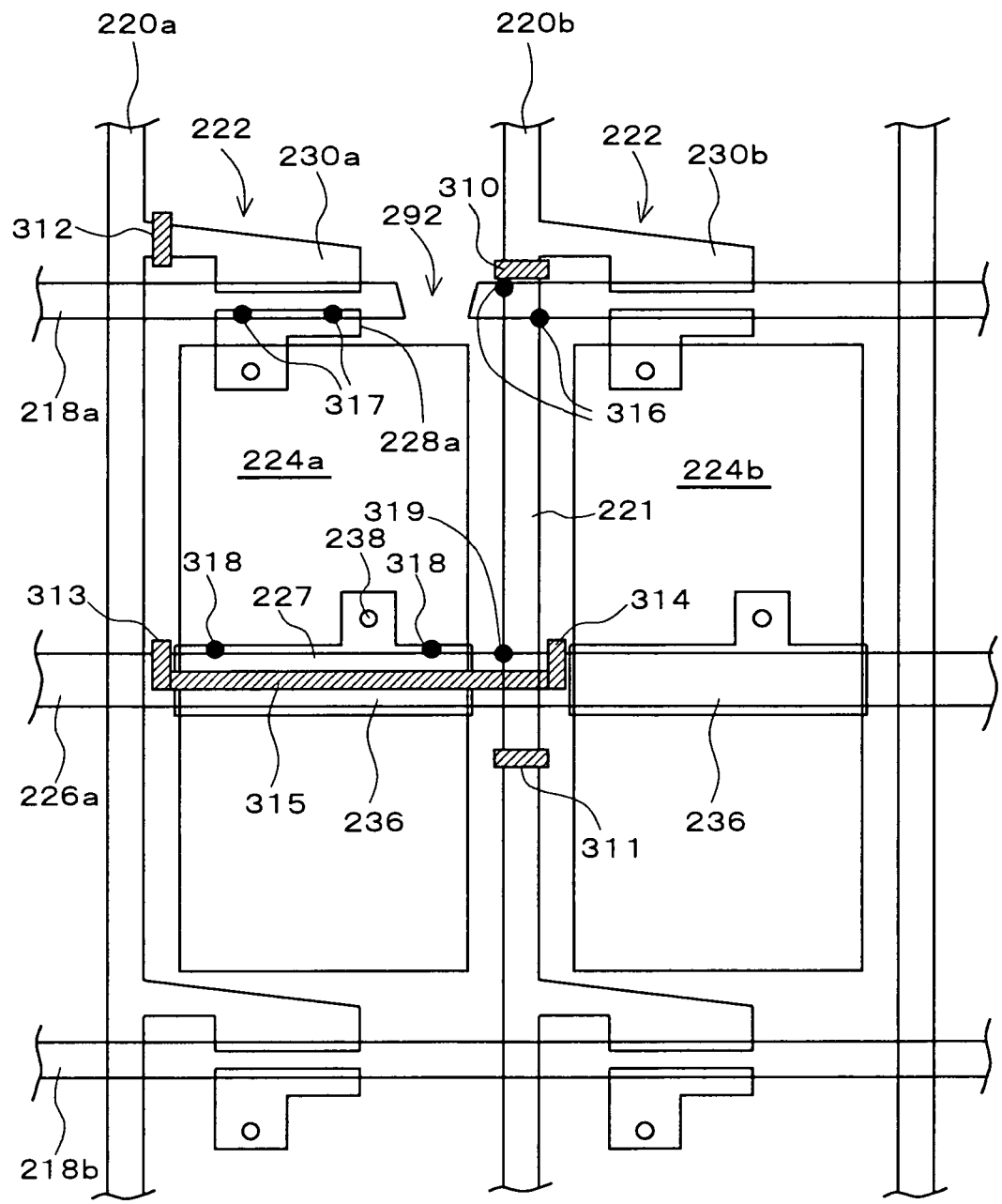
FIG. 8 schematically illustrates a first embodiment of a method for repairing a defect in a display in a second mode for carrying out the invention.
Figure 32A:
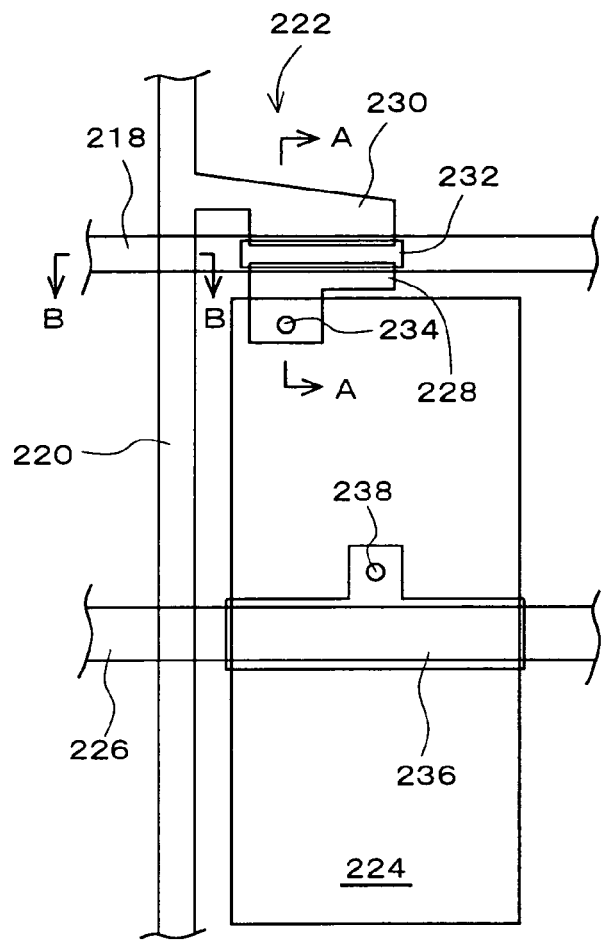
FIGS. 32a, 32b and 32c illustrate a schematic configuration of an element portion of a liquid crystal display.
Figure 32B:
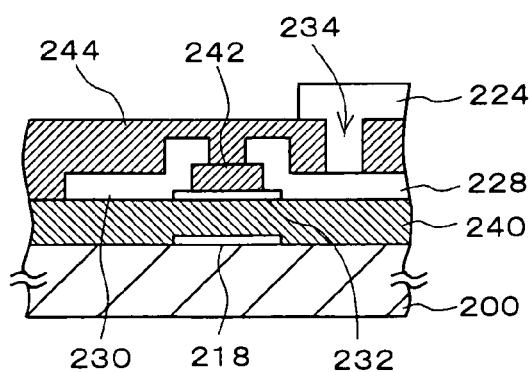
Figure 32C:
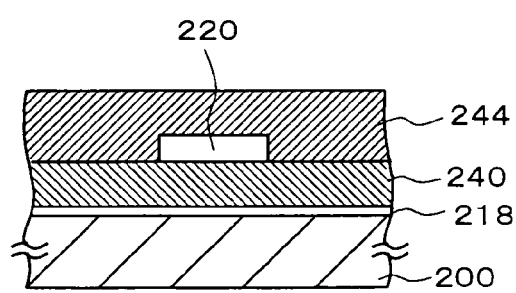
Figure 33A:
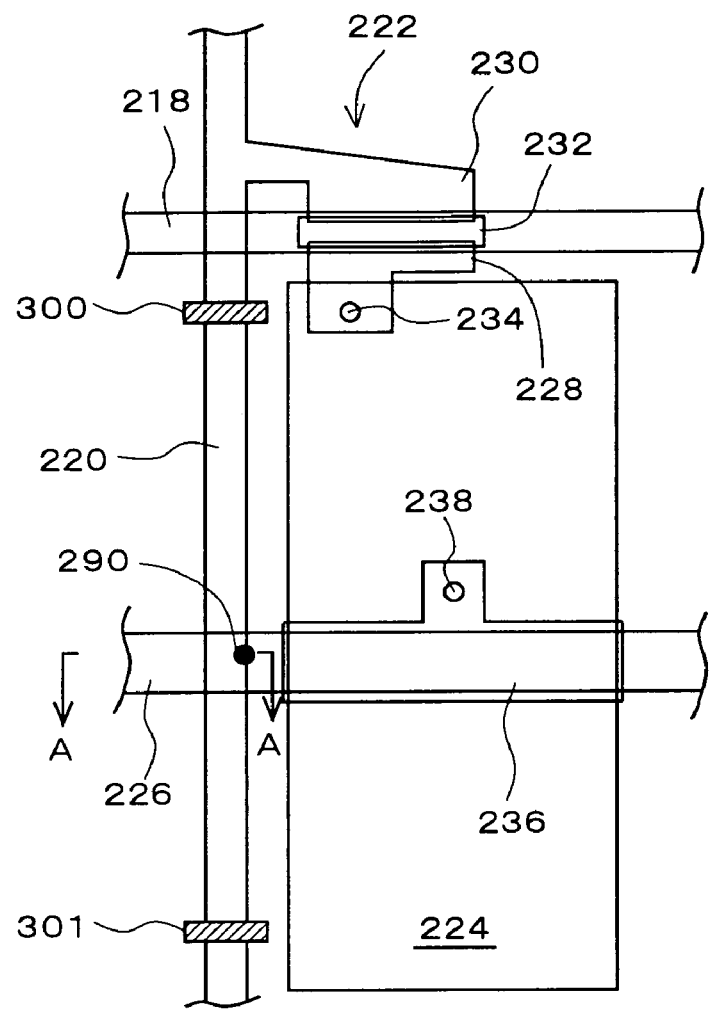
FIGS. 33a and 33b illustrate a method for repairing a liquid crystal display according to the related art.
Figure 33B:
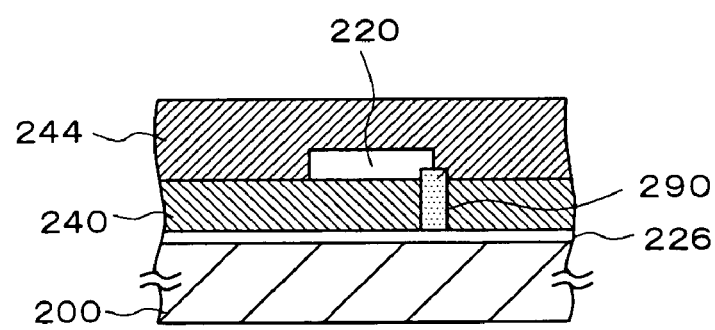

FIG. 8 shows a plurality of pixel regions as seen when the substrate surface is viewed from above, each of the pixels having the same structure as that shown in FIGS. 32a through 32c. In FIG. 8, a gate bus line 218a that horizontally extends substantially in the middle of the figure is broken at a broken portion 292.

First, a laser beam irradiates a cutting position 310 between a region where a drain electrode 230b and a drain bus line 220b are connected and an intersection between the drain bus line 220b and the gate bus line 218a to cut the drain bus line 220b. Then, a cutting position 312 at the base of a drain electrode 230a which extends from a drain bus line 220a to a position above the gate bus line 218a is cut by irradiating the same with a laser beam. Then, a laser beam is scanned along a storage capacitor bus line 226a to irradiate a cutting position 313 between the drain bus line 220a and a pixel electrode 224a adjacent thereto, a cutting position 314 between the drain bus line 220b and a pixel electrode 224b adjacent thereto and a cutting position 315 substantially in the middle of the storage capacitor bus line 226a between the cutting positions 313 and 314, which isolates a part of the storage capacitor bus line along with the upper half of the pixel electrode 224a and a part of a storage capacitor electrode 236. As a result, a first isolated line 221 is defined by the cutting positions 310 and 315, and a second isolated line 227 is defined by the cutting positions 313, 314 and 315.

The cutting position 315 must be irradiated with a laser beam having intensity controlled such that no inter-layer short-circuit occurs at an intersection between the storage capacitor bus line 226a and drain bus line 220b. It is difficult to control the intensity of a laser beam irradiating a continuous linear configuration like the cutting position 315, although it is relatively easy in the case of irradiation of a spot. Therefore, a short-circuit can occur between the storage capacitor bus line 226a and drain bus line 220b. When an inter-layer short-circuit occurs at an intersection between the storage capacitor bus line 226a and drain bus line 220b, a normal drain signal can not be supplied even if the drain bus line 220b beyond the first isolated line 221 is relieved using a repair line similar to that in the related art. In order to prevent such a situation reliably, a cutting position 311 located on the side of the cutting position 315 opposite to the first isolated line 221 is irradiated with a laser beam to ensure the disconnection between the storage capacitor bus line 226a and the drain bus line 220b beyond the cutting position 315.

Next, two connecting positions 316 at an intersection between the first isolated line 221 and gate bus line 218a are irradiated with a laser beam to short the first isolated line 221 and gate bus line 218a at the intersection. Further, two connecting positions 317 of a source electrode 228a located in a face-to-face relationship with the drain electrode 230a whose base has been cut are irradiated with a laser beam to short the gate bus line 218a and source electrode 228a. Then, two connecting positions 318 of the second isolated line (including a part of the storage capacitor electrode 236) 227 are irradiated with a laser beam to short the upper half of the pixel electrode 224a and the second isolated line 227. Further, a connecting position 319 is irradiated with a laser beam to short the second isolated line 227 and first isolated line 221.

This establishes electrical connection between the source electrode 228a, pixel electrode 224a, second isolated line 227 and first isolated line 221. One end of the broken gate bus line 218a is electrically connected to the source electrode 228a, and the other end is electrically connected to the first isolated line 221. Therefore, the gate bus line 218a is capable of supplying a gate pulse to pixel regions other than the pixel region where the halved pixel electrode 224a is located. The drain bus line 220b broken to form the first isolated line 221 can be relieved using a repair line similar to that in the related art to drive all pixels connected to the drain bus line 220b properly.

Thus, the present mode for carrying out the invention makes it possible to repair a breakage in a gate bus line at the sacrifice of only one pixel in total.

A second embodiment will now be described.

Figure 9:
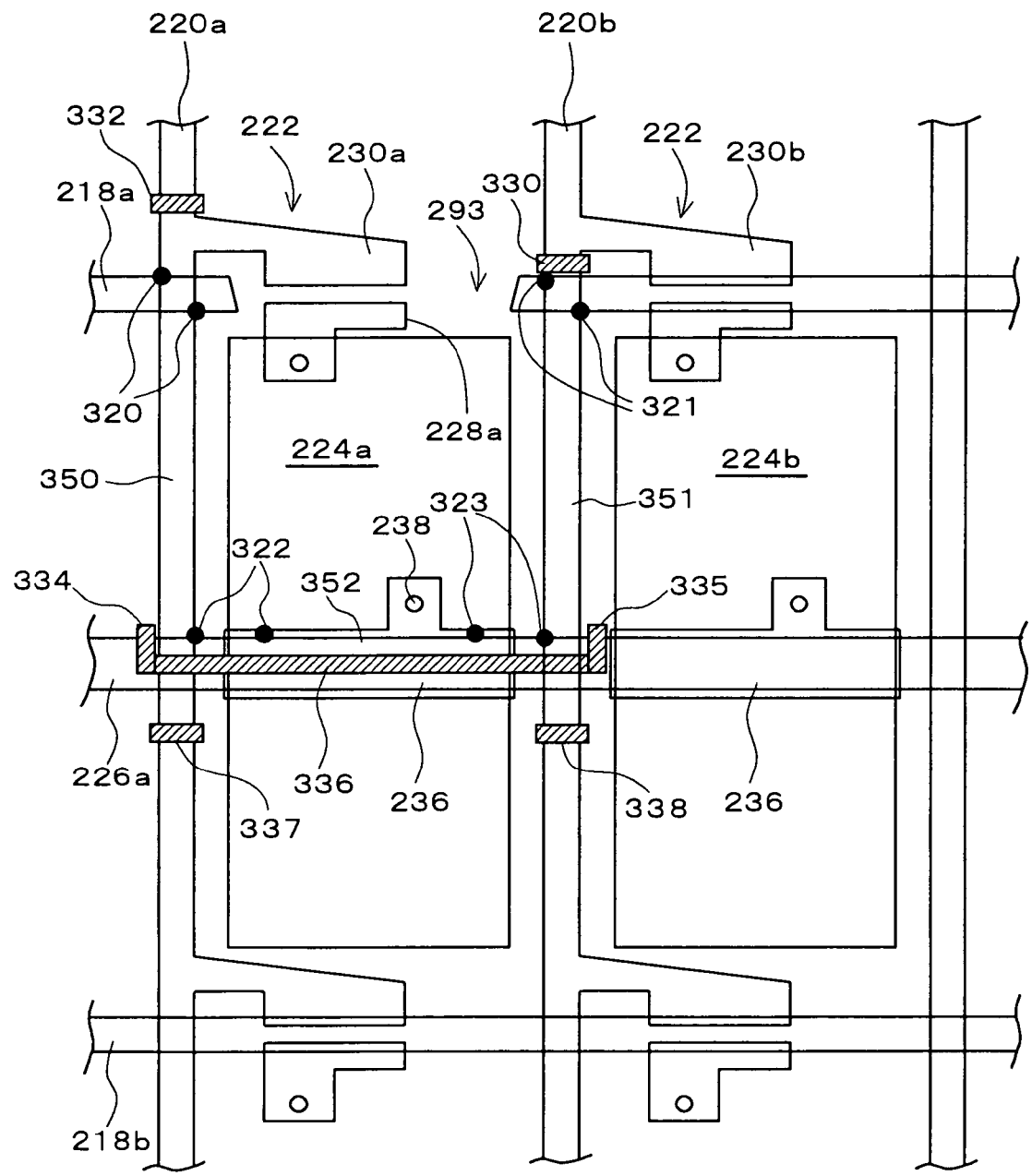
FIG. 9 schematically illustrates a second embodiment of a method for repairing a defect in a display in the second mode for carrying out the invention.

FIG. 9 shows a plurality of pixel regions as seen when a substrate surface is viewed from above, each of the pixels having the same structure as that shown in FIG. 8. In FIG. 9, a gate bus line 218a horizontally extending substantially in the middle of the figure is broken at a broken portion 293 having a length which substantially corresponds to one pixel region.

First, a laser beam irradiates a cutting position 330 between a connecting portion of a drain electrode 230b on a drain bus line 220b and an intersection region between the drain bus line 220b and the gate bus line 218a to cut the drain bus line 220b. Then, a cutting position 332 which is closer to a drain driving circuit than a drain electrode 230a connected to a drain bus line 220a is irradiated with a laser beam to cut the drain bus line 220a. Then, a laser beam is scanned along a storage capacitor bus line 226a to irradiate cutting positions 334 and 335 which are located outside the drain bus lines 220a and 220b respectively and which are not in contact with adjacent pixel electrodes 224 and to irradiate a cutting position 336 substantially in the middle of the storage capacitor bus line 226a between the cutting positions 334 and 335. As a result, a first isolated line 350 isolated from the drain bus line 220a and a second isolated line 351 isolated from the drain bus line 220b are defined. Further, a part of the storage capacitor bus line 226a is isolated along with the upper half of the pixel electrode 224a and a part of a storage capacitor electrode 236 to form a third isolated line 352.

In consideration to the possibility of an inter-layer short-circuit at an intersection between the storage capacitor bus line 226a and drain bus line 220a or an intersection between the storage capacitor bus line 226a and drain bus line 220b, a cutting position 337 located on the side of the cutting position 336 opposite to the first isolated line 350 is irradiated with a laser beam to ensure the disconnection between the storage capacitor bus line 226a and the drain bus line 220a beyond the cutting position 337. Similarly, a cutting position 338 located on the side of the cutting position 336 opposite to the second isolated line 351 is irradiated with a laser beam to ensure the disconnection between the storage capacitor bus line 226a and the drain bus line 220b beyond the cutting position 338.

Next, two connecting positions 320 at an intersection between the first isolated line 350 and gate bus line 218a are irradiated with a laser beam to short the first isolated line 350 and gate bus line 218a at the intersection. Further, two connecting portions 321 at an intersection between the second isolated line 351 and gate bus line 218a are irradiated with a laser beam to short the second isolated line 351 and gate bus line 218a at the intersection.

Further, a connecting portion 322 is irradiated with a laser beam to short the first isolated line 350 and third isolated line 352, and a connecting portion 323 is irradiated with a laser beam to short the second isolated line 351 and third isolated line 352.

This establishes electrical connection between the first, second and third isolated lines 350, 351 and 352. One end of the broken gate bus line 218a is electrically connected to the first isolated line 350, and the other end is electrically connected to the second isolated line 351. Therefore, the gate bus line 218a is capable of supplying a gate pulse to pixel regions other than the pixel region where the halved pixel electrode 224a is located. The drain bus line 220b broken to form the second isolated line 351 can be relieved using a repair line similar to that in the related art to drive all pixels connected to the drain bus line 220b properly.

Thus, the present mode for carrying out the invention makes it possible to repair a breakage in a gate bus line at the sacrifice of only one pixel in total.

A third embodiment will now be described.

Figure 10:
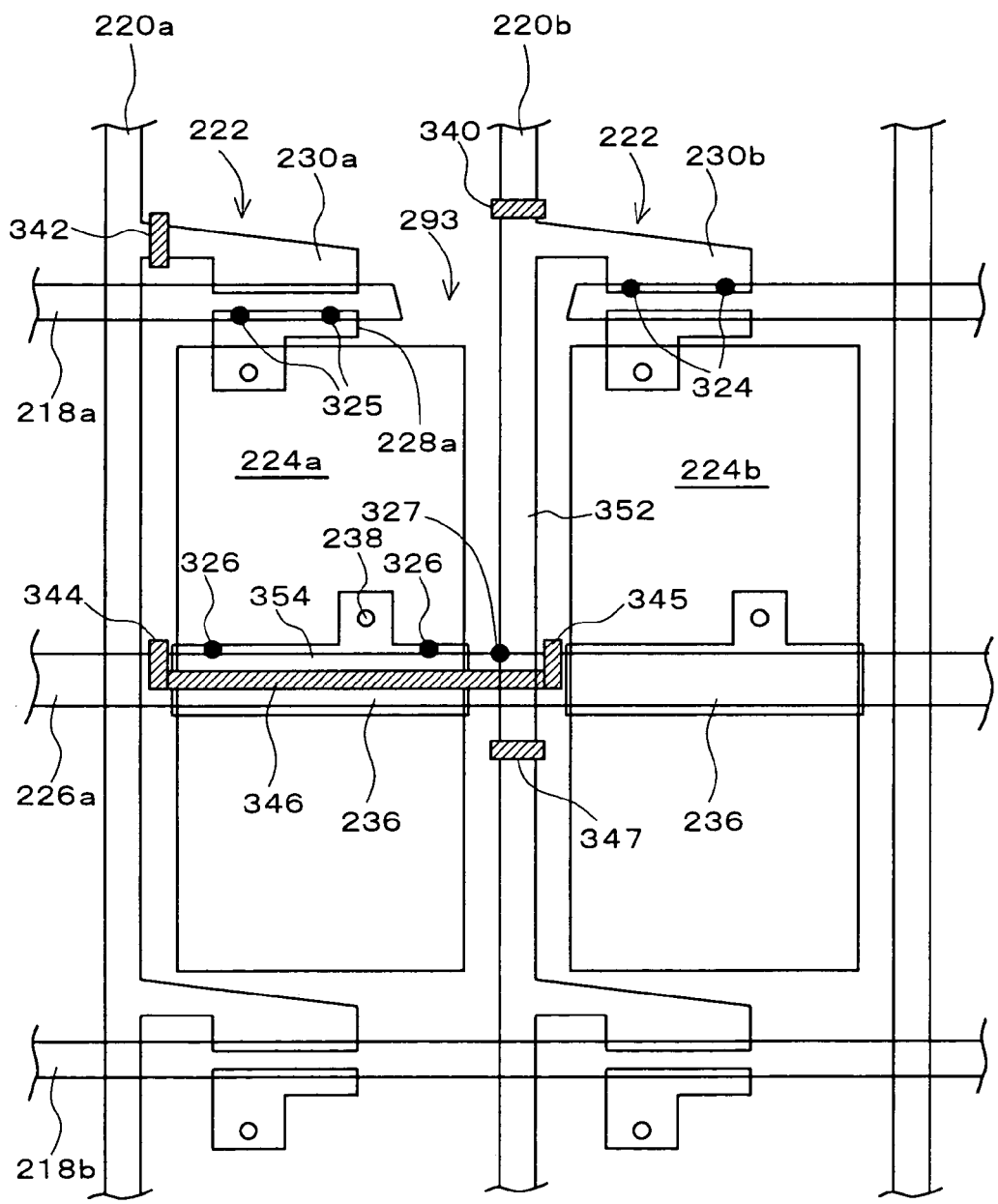
FIG. 10 schematically illustrates a third embodiment of a method for repairing a defect in a display in the second mode for carrying out the invention.

FIG. 10 shows a plurality of pixel regions as seen when the substrate surface is viewed from above, each of the pixel regions having the same structure as that shown in FIG. 8. In FIG. 10, a gate bus line 218a horizontally extending substantially in the middle of the figure is broken at a broken portion 293 under a drain bus line 220b.

First, a cutting position 340 located closer to a drain driving circuit than a drain electrode 230b connected to the drain bus line 220b is irradiated with a laser beam to cut the drain bus line 220b. Then, a cutting position 342 at the base of a drain electrode 230a which extends from a drain bus line 220a to a position above the gate bus line 218a is irradiated with a laser beam to cut the same. Then, a laser beam is scanned along a storage capacitor bus line 226a to irradiate a cutting position 344 between the drain bus line 220a and a pixel electrode 224a adjacent thereto, a cutting position 345 between the drain bus line 220b and a pixel electrode 224b adjacent thereto and a cutting position 346 substantially in the middle of the storage capacitor bus line 226a between the cutting positions 344 and 345. As a result, a part of the storage capacitor bus line is isolated along with the upper half of the pixel electrode 224a and a part of a storage capacitor electrode 236. As a result, a first isolated line 352 is defined by the cutting positions 340 and 346, and a second isolated line 354 is defined by the cutting positions 344, 345 and 346.

In consideration to the possibility of an inter-layer short-circuit at an intersection between the storage capacitor bus line 226a and drain bus line 220b, a cutting position 347 located on the side of the cutting position 346 opposite to the first isolated line 352 is irradiated with a laser beam to ensure the disconnection between the storage capacitor bus line 226a and the drain bus line 220b beyond the cutting position 347.

Next, two connecting positions 324 between the drain electrode 230b and gate bus line 218a are irradiated with a laser beam to short the gate bus line 218a, the drain electrode 230b and the first isolated line 352 connected thereto. Further, two connecting positions 325 between a source electrode 228a located opposite to the drain electrode 230a whose base portion has been cut and the gate bus line 218a are irradiated with a laser beam to short the gate bus line 218a and the source electrode 228a. Then, two connecting positions 326 of the second isolated line (including a part of the storage capacitor electrode 236) 354 are irradiated with a laser beam to short the upper half of the pixel electrode 224a and the second isolated line 354. Further, a connecting position 327 is irradiated with a laser beam to short the second isolated line 354 and first isolated line 352.

This establishes electrical connection between the source electrode 228a, pixel electrode 224a, second isolated line 354 and first isolated line 352. One end of the broken gate bus line 218a is electrically connected to the source electrode 228a, and the other end is electrically connected to the drain electrode 230b which is connected to the first isolated line 352. Therefore, the gate bus line 218a is capable of supplying a gate pulse to pixel regions other than the pixel region where the halved pixel electrode 224a is located and the pixel region with the drain electrode 230b connected to the first isolated line 352. The drain bus line 220b broken to form the first isolated line 352 can be relieved using a repair line similar to that in the related art to properly drive pixels connected to the drain bus line 220b other than the pixel with the pixel electrode 224b.

Thus, the present mode for carrying out the invention makes it possible to repair a breakage in a gate bus line at the sacrifice of only two pixels in total.

Figure 34:
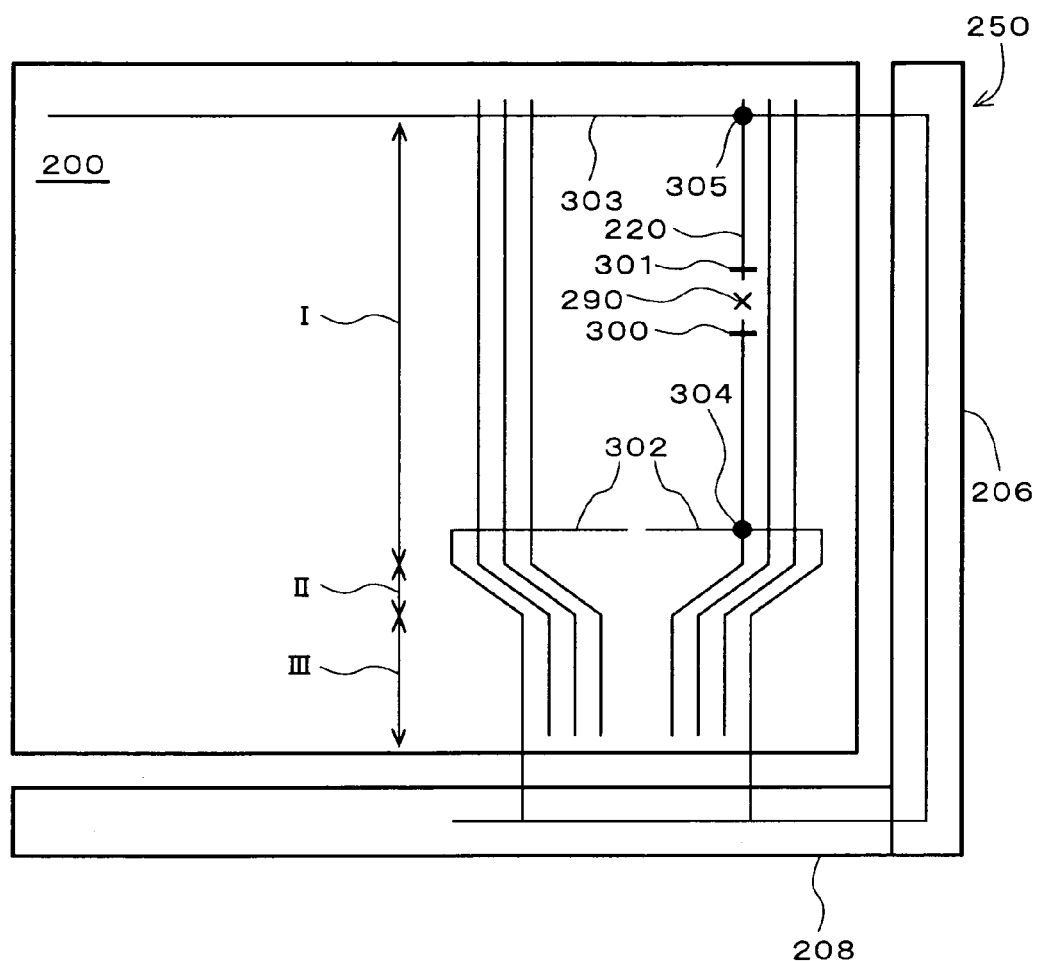
FIG. 34 illustrates a method for repairing a liquid crystal display according to the related art.

A description will now be made with reference to FIGS. 11 through 22 on a display and a method for repairing a defect in the same according to a third mode for carrying out the invention. The present mode for carrying out the invention is related to a method for repairing a line breakage at an extraction wiring portion II for gate bus lines 218 or drain bus lines 220 as shown in FIG. 34. In a display in which a plurality of bus lines are formed in parallel in a display area, the present mode for carrying out the invention is characterized in that there is provided repair lines for repairing a line breakage that has occurred at an extraction wiring portion between the display area and an external connection terminal portion for the plurality of bus lines. The present mode for carrying out the invention will be described below with reference to embodiments. Components having the same functions as those in the first and second modes for carrying out the invention will be indicated by like reference numbers and will not be described.

A first embodiment will now be described.

Figure 11:
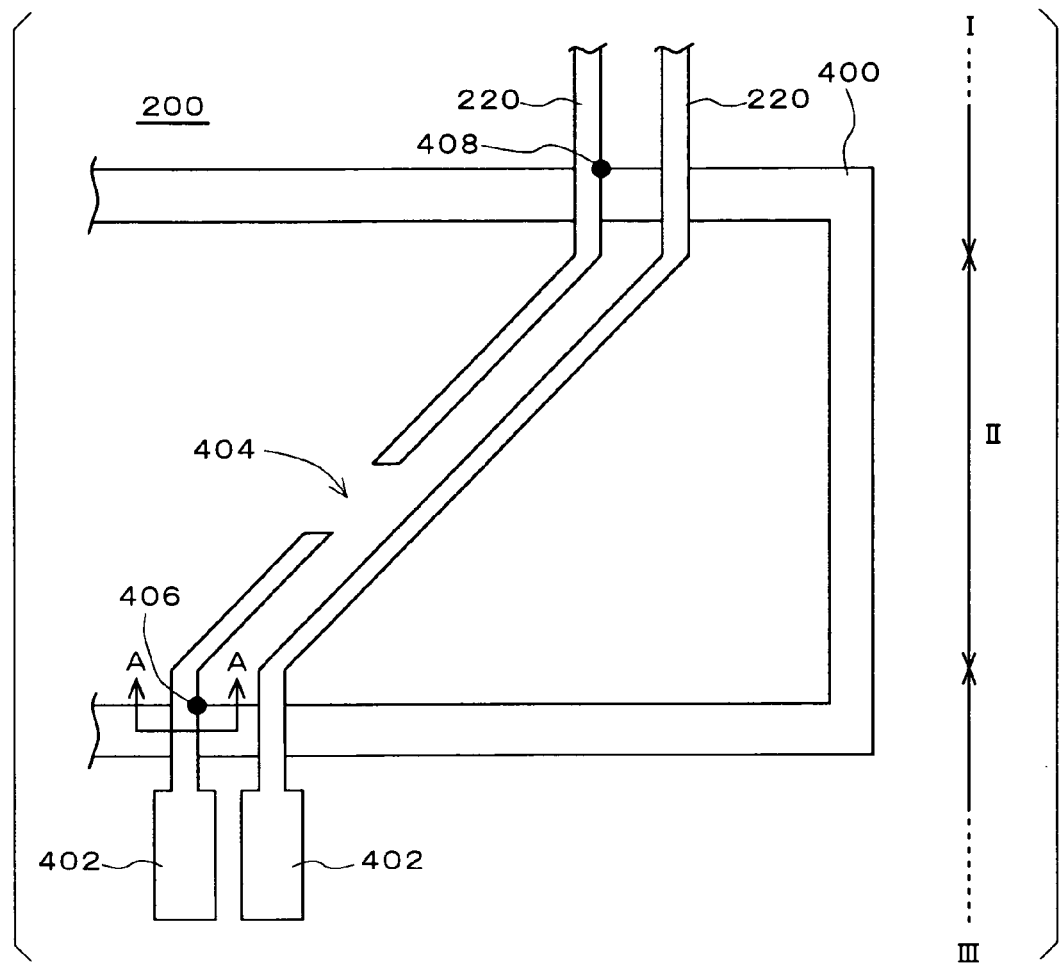
FIG. 11 schematically illustrates a first embodiment of a method for repairing a defect in a display in a third mode for carrying out the invention.
Figure 12:
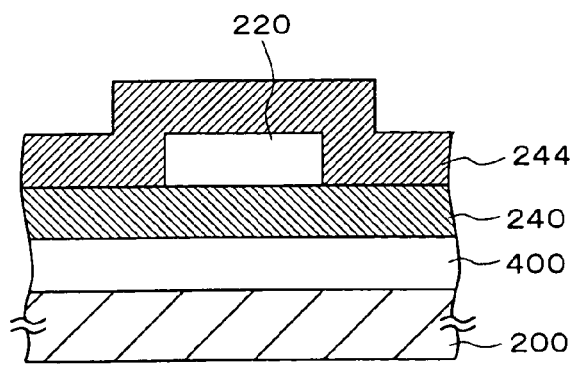
FIG. 12 schematically illustrates the first embodiment of a method for repairing a defect in a display in the third mode for carrying out the invention.

FIG. 11 illustrates a part of an extraction wiring portion II for drain bus lines 220 formed on a TFT substrate 200 and the neighborhood of the part. FIG. 12 is a sectional view taken along the line A—A in FIG. 11. As shown in FIG. 11, a plurality of drain bus lines 220 formed in parallel in a display area I are bent at an angle at an extraction wiring portion II and are connected to respective external connection terminals 402 at a terminal portion III. A repair line 400 is provided between a display area I in the vicinity of the extraction wiring portion II and the terminal portion III such that they encompass the region of the extraction wiring portion II. The repair line 400 includes two lines which intersect a plurality of drain bus lines 220 on both sides of the display area I and terminal portion III when viewed from the surface of the TFT substrate 200. Those two lines are connected to each other at an end of the extraction wiring portion II.

As shown in FIG. 12, the repair line 400 is formed from a metal that is used to form gate bus lines at the same time when the gate bus lines 218 are formed on the TFT substrate 200. The repair line 400 forms a multi-layer structure in combination with the drain bus lines 220 with a gate insulation film 240 interposed between them, and it is electrically insulated from the plurality of drain bus lines 220.

For example, when there is a breakage 404 in a certain drain bus line 220 at an extraction wiring portion II as shown in FIG. 11, regions 406 and 408 where the drain bus line 220 intersects the repair line 400 are irradiated with a laser beam to fuse the drain bus line 220 and repair line 400 together, thereby shorting them. Thus, a breakage in a drain bus line 220 at the extraction wiring portion II can be easily repaired.

Figure 13:
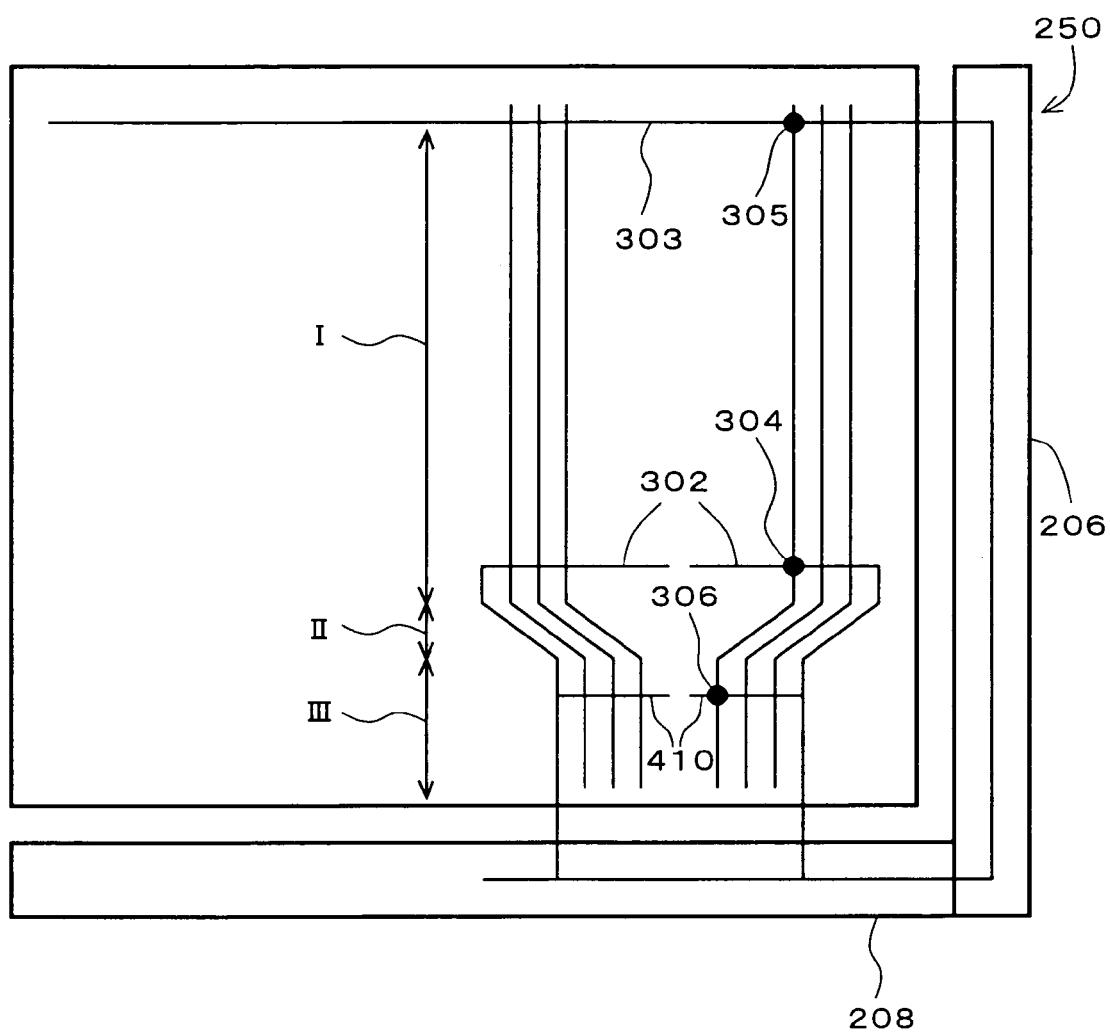
FIG. 13 schematically illustrates a modification of the first embodiment of a method for repairing a defect in a display in the third mode for carrying out the invention.

FIG. 13 illustrates a modification of the present embodiment. In addition to repair lines 302 and 303 according to the related art as shown in FIG. 34, repair lines 410 which intersect the drain bus lines 220 with an insulation film interposed therebetween are formed in the vicinity of a terminal portion III. The repair lines 410 are connected to the repair lines 302 and 303. In such a configuration, a breakage in a drain bus line 220 at the display area I can be repaired by irradiating intersecting regions 304 and 305 (or 306 and 305) with a laser beam as in the related art, and a breakage of a drain bus line 220 at the extraction wiring portion II can be repaired by irradiating the intersecting regions 304 and 306 with a laser beam as in the present embodiment. This configuration can be quite easily implemented because it is required only to add the repair lines 410 to a panel according to the related art.

A description will now be made with reference to FIG. 14 on a repair of a short-circuit 412 in a single layer between adjoining drain bus lines 220 utilizing a repair line 400 according to the present embodiment. As shown in FIG. 14, when a short-circuit 412 in a single layer occurs at a location where a sealing material 418 is applied to put two substrates together, the sealing material 418 hinders the short-circuit 412 in the single layer from being cut as a result of direct irradiation with a laser beam. In this case, one of the drain bus lines 220 is cut at the cutting positions 414 and 416 which can be irradiated by a laser beam. Then, regions 406 and 408 where the drain bus line 220 intersects the repair line 400 are irradiated with a laser beam to fuse the drain bus line 220 and repair line 400 together, thereby shorting them. Thus, a short-circuit in a single layer between the drain bus lines 220 at the extraction wiring portion II can be easily repaired.

A second embodiment will now be described.

Figure 15:
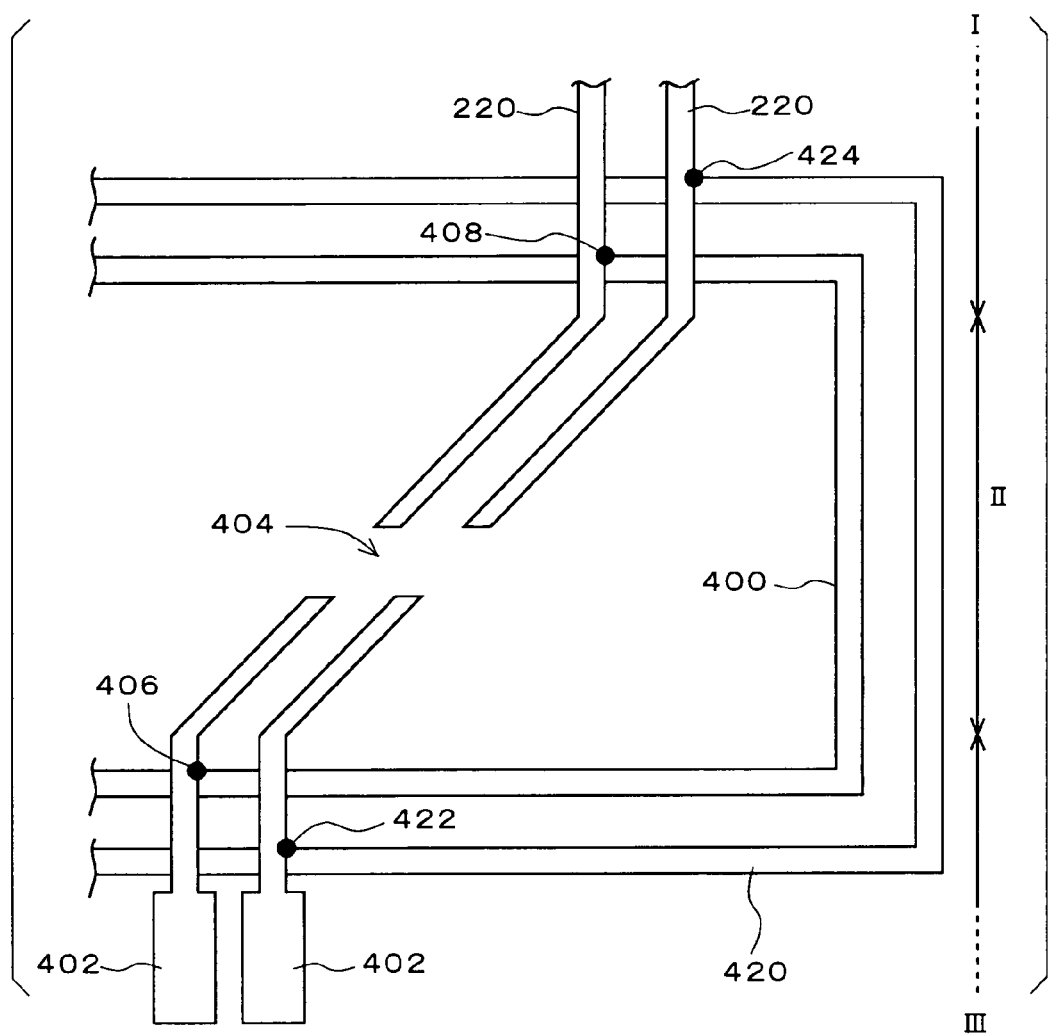
FIG. 15 schematically illustrates a second embodiment of a method for repairing a defect in a display in the third mode for carrying out the invention.

As shown in FIG. 15, the present embodiment is characterized in that defects at two locations in the extraction wiring portion II can be handled by providing a further repair line 420 outside the repair line 400 and by irradiating intersecting regions 422 and 424 with a laser beam to relieve the two drain bus lines 220. By providing a plurality of repair lines at the extraction wiring portion II, a plurality of defects in the extraction wiring portion II can be relieved.

A third embodiment will now be described.

Figure 16:
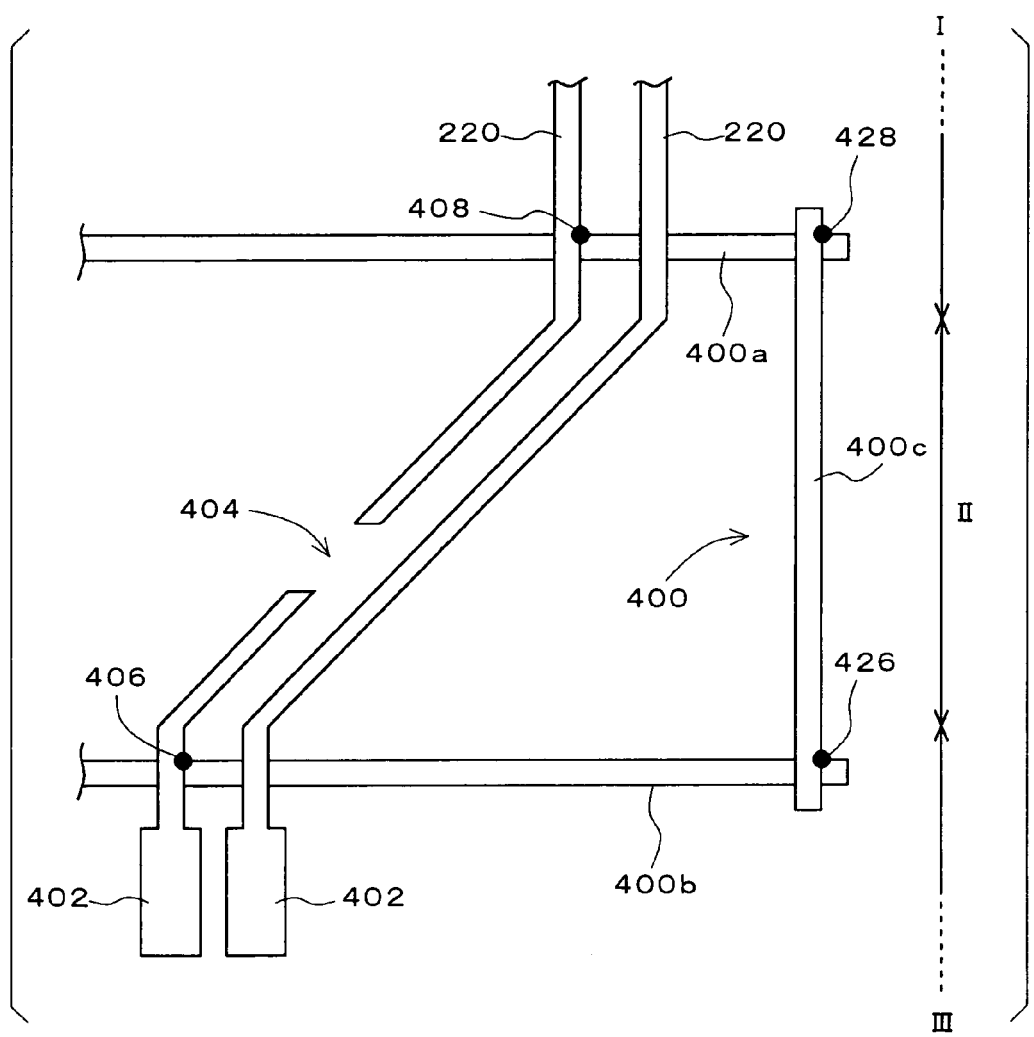
FIG. 16 schematically illustrates a third embodiment of a method for repairing a defect in a display in the third mode for carrying out the invention.

As shown in FIG. 16, the present embodiment is characterized in that three electrically insulated repair lines 400 are formed. That is, a repair line 400*a* is formed in the display area I in the vicinity of the extraction wiring portion II, and a repair line 400*b* is formed at the terminal portion III. The repair lines 400*a* and 400*b* are formed at the same time when the gate bus lines 218 are formed. A repair line 400*c* is formed at the extraction wiring portion II such that it intersect the repair lines 400*a* and 400*b* with an insulation film interposed therebetween.

For example, when there is a breakage 404 in a certain drain bus line 220 at the extraction wiring portion II as shown in FIG. 16, regions 408 and 406 where the drain bus line 220 intersects the repair lines 400*a* and 400*b* respectively are irradiated with a laser beam to fuse the drain bus line 220 and repair lines 400*a* and 400*b* together, thereby shorting them. At the same time, regions 428 and 426 where the repair line 400*c* intersects the repair lines 400*a* and 400*b* respectively are irradiated with a laser beam to fuse the repair lines 400*c* with the repair lines 400*a* and 400*b*, thereby shorting them.

This reduces the length of the repair line intersecting the drain bus line 220 and allows capacitance applied to the drain bus line 220 to be decreased when no repair is performed. As a result, the drain driving circuit 208 may have a smaller driving capacitance.

A fourth embodiment will now be described.

Figure 17:
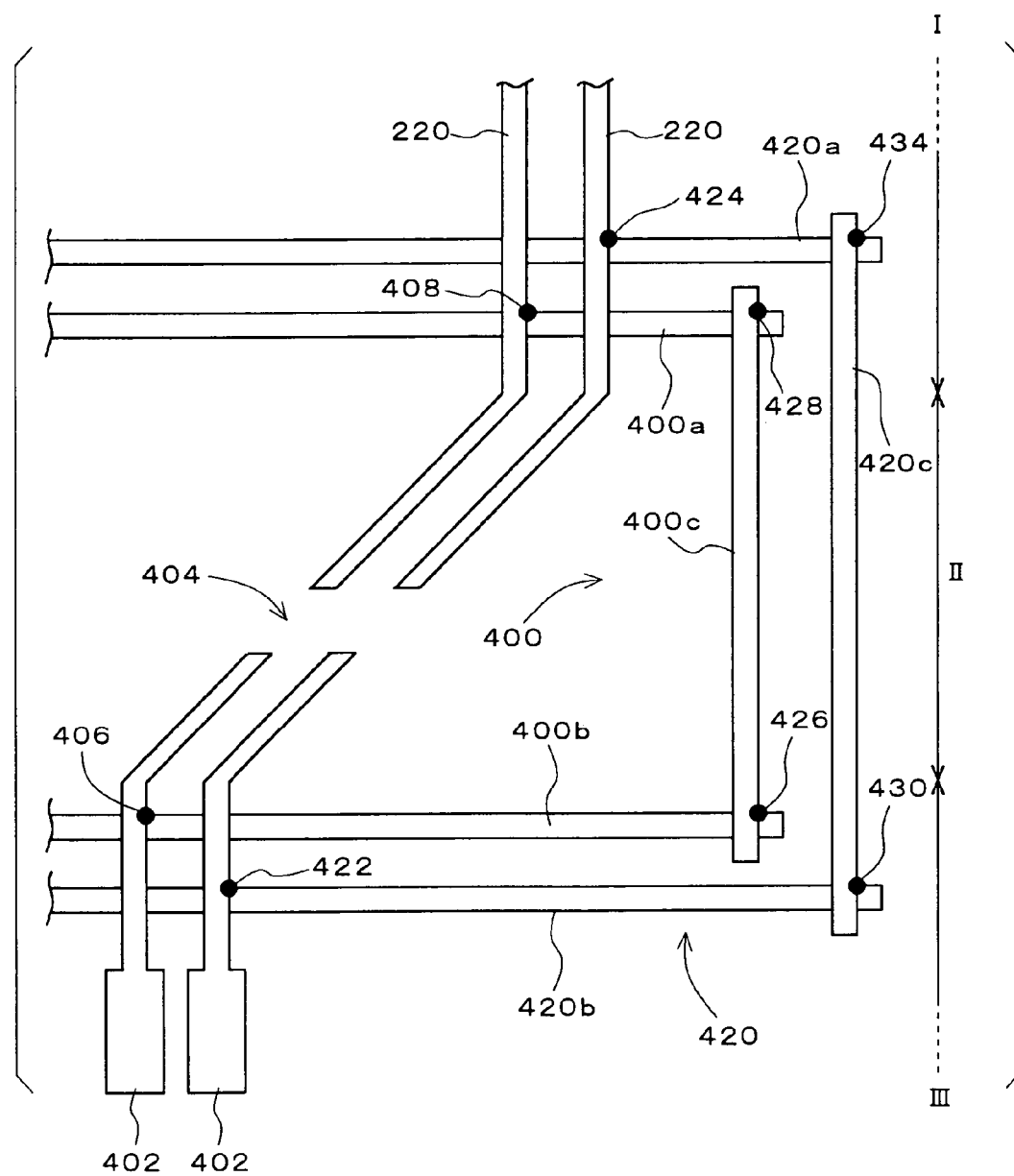
FIG. 17 schematically illustrates a fourth embodiment of a method for repairing a defect in a display in the third mode for carrying out the invention.

As shown in FIG. 17, the present embodiment is characterized in that defects in two locations of the extraction wiring portion II can be handled by providing repair lines 420 (420*a*, 420*b*, 420*c*) having the same configuration as the repair lines 400 (400*a*, 400*b*, 400*c*) outside the repair lines 400 and by irradiating intersecting regions 422, 424 and intersecting regions 430 and 434 with a laser beam to relieve the two drain bus lines 220. By providing a plurality of repair lines at the extraction wiring portion II, a plurality of defects in the extraction wiring portion II can be relieved.

A fifth embodiment will now be described.

Figure 18:
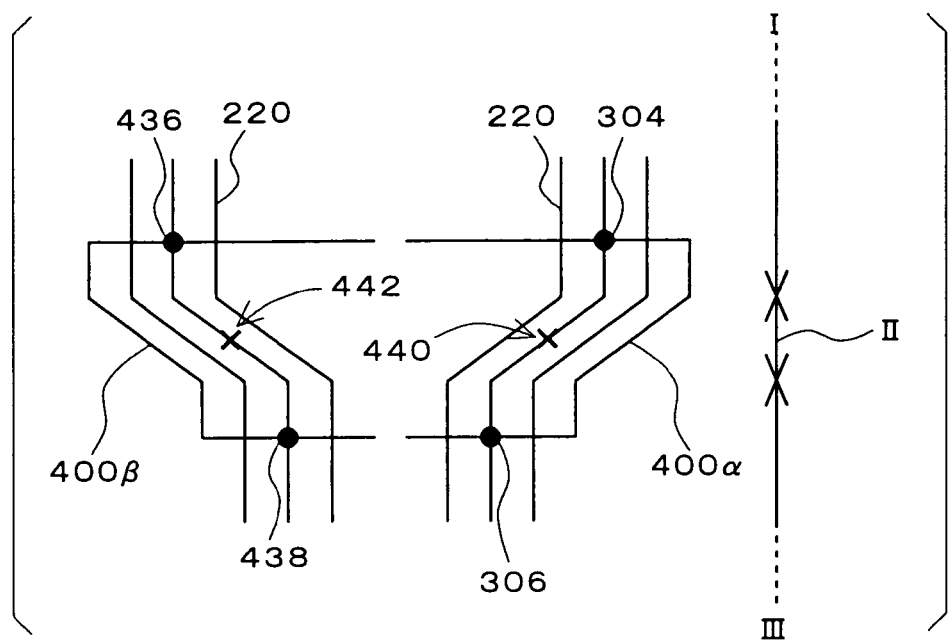
FIG. 18 schematically illustrates a fifth embodiment of a method for repairing a defect in a display in the third mode for carrying out the invention.

FIG. 18 is a schematic view of an area around the extraction wiring portion II which corresponds to FIG. 13. The plurality of drain bus lines 220 are divided into several blocks, and repair lines 400α, 400β, . . . are configured for respective blocks. The repair lines are insulated between the blocks. This makes it possible to relieve a line breakage at the extraction wiring portion II on a block basis.

A sixth embodiment will now be described.

Figure 19:
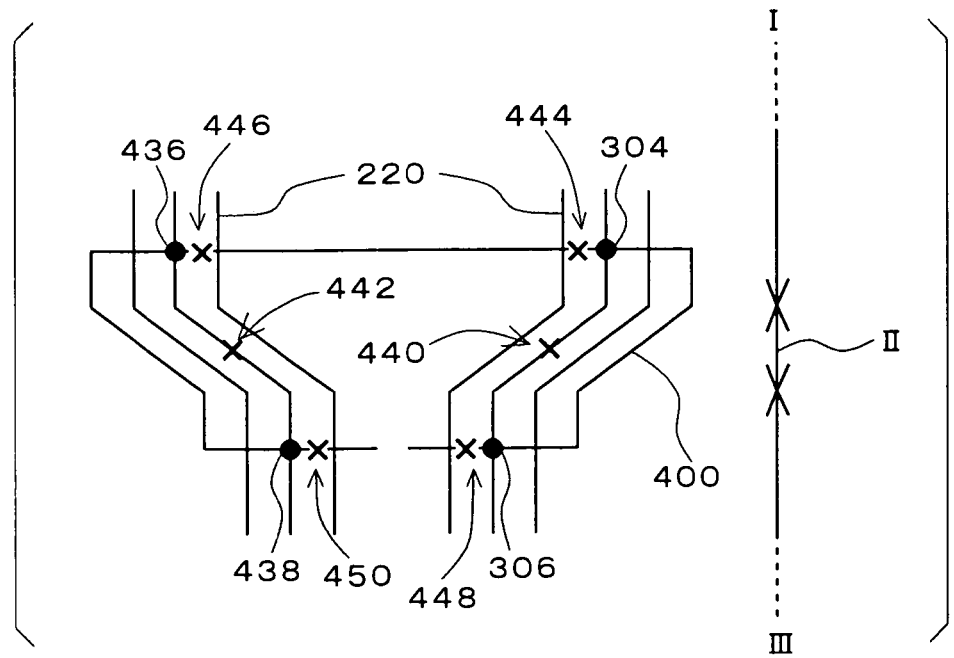
FIG. 19 schematically illustrates a sixth embodiment of a method for repairing a defect in a display in the third mode for carrying out the invention.

FIG. 19 is a schematic view of an area around the extraction wiring portion II which corresponds to FIG. 13. The present embodiment is characterized in that a repair line 400 in the form of a ring is provided such that it intersects all of the drain bus lines 220 unlike the fifth embodiment. This makes it possible to relieve two broken lines 440 and 442 at the extraction wiring portion II wherever in the single ring they occurs. In this case, intersecting regions 304, 306, 436 and 438 are irradiated with a laser beam to connect the drain bus lines 220 and the repair line 400; the ring formed by the repair line 400 is cut at cutting positions 444 and 446 inside the intersecting regions 304 and 436 in the vicinity thereof; and the ring formed by the repair line 400 is cut at cutting positions 448 and 450 inside the intersecting regions 306 and 438 in the vicinity thereof. While the repair lines 400α, 400β, . . . of the fifth embodiment makes it possible to relieve only one line in each block, the present embodiment relieves a broken line with an increased degree of freedom because the defect can be relieved wherever it occurs within the ring. Further, since redundant wiring can be cut off in the vicinity of the intersecting regions 304, 306, 436 and 438, resistance and capacitance attributable to repair lines can be reduced.

A seventh embodiment will now be described.

Figure 20:
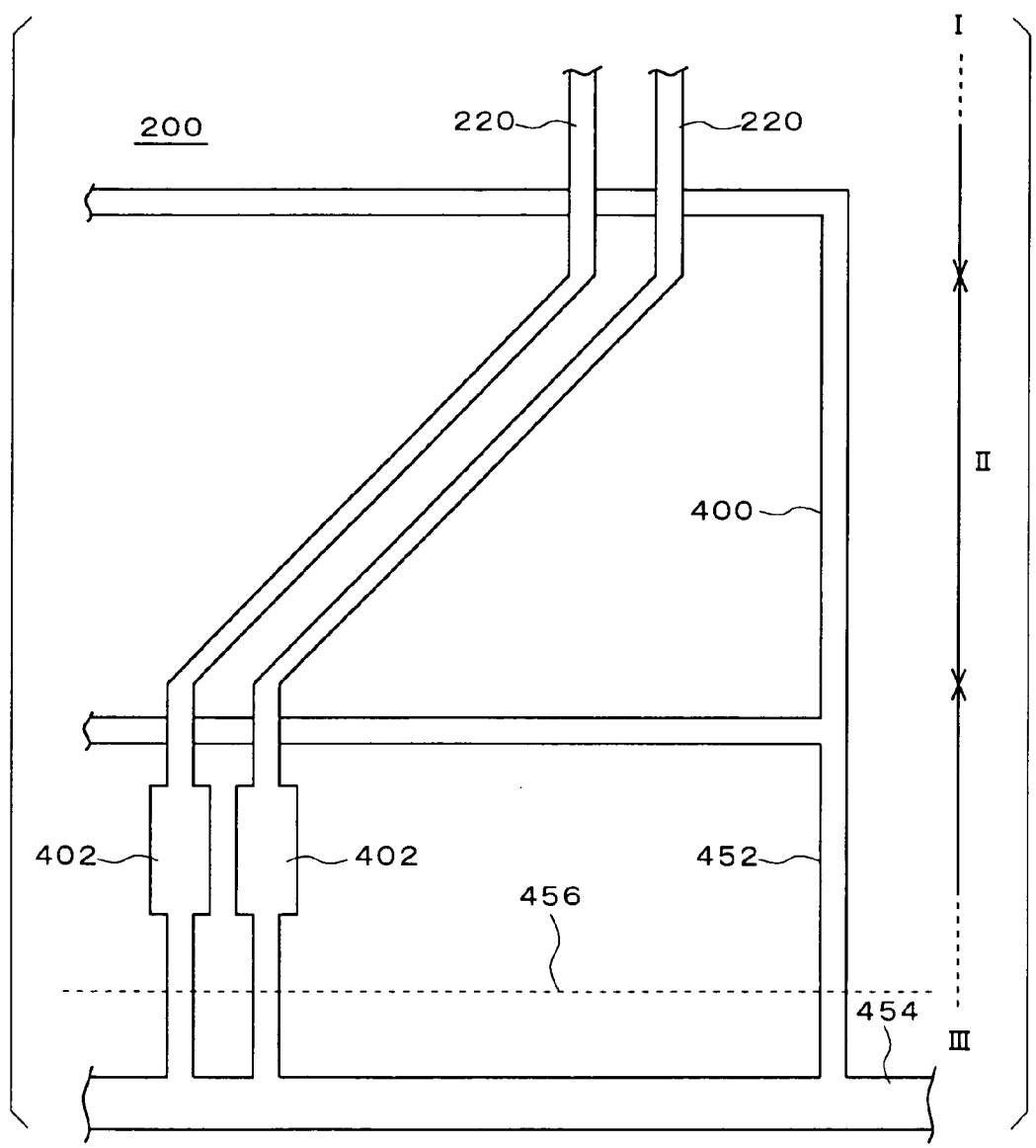
FIG. 20 schematically illustrates a seventh embodiment of a method for repairing a defect in a display in the third mode for carrying out the invention.

As shown in FIG. 20, the present embodiment is characterized in that a repair line 400 is connected through a connection line 452 to a short ring 454 provided to prevent electrostatic faults. This prevents the occurrence of a short-circuit attributable to electrostatic breakdown at an intersection between a drain bus line 220 and the repair line 400 even if static electricity is generated at array processing for forming elements on a TFT substrate 200. Since the short ring 454 is cut at a scribe line 456 to be removed when the panel is completed, the drain bus line 220 and repair line 400 are electrically isolated from each other.

An eighth embodiment will now be described.

Figure 21:
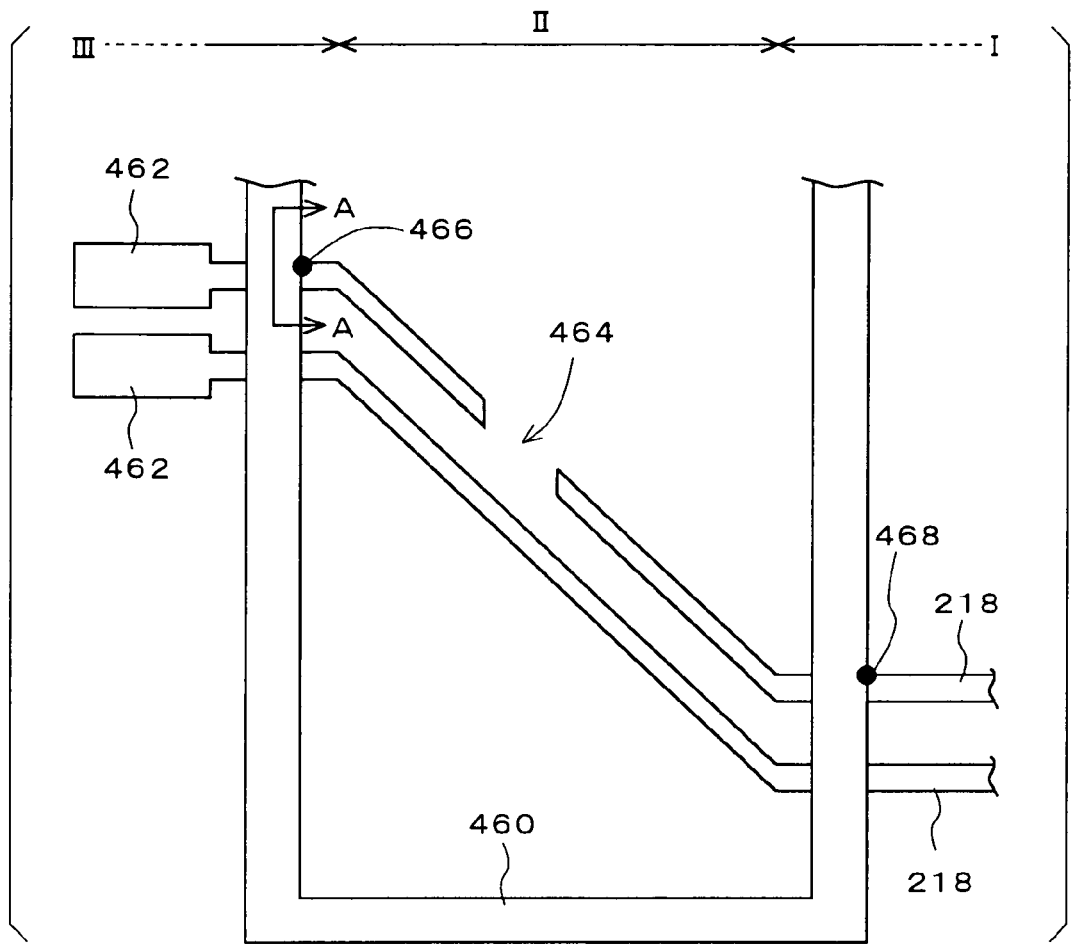
FIG. 21 schematically illustrates an eighth embodiment of a method for repairing a defect in a display in the third mode for carrying out the invention.
Figure 22:
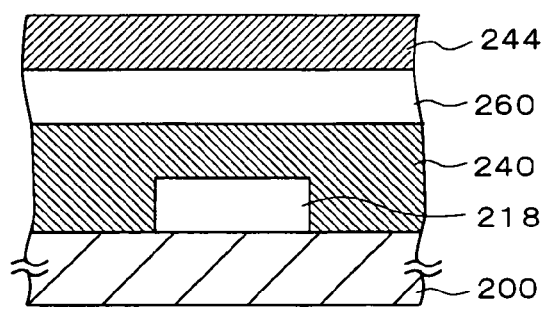
FIG. 22 schematically illustrates the eighth embodiment of a method for repairing a defect in a display in the third mode for carrying out the invention.

FIG. 21 shows a part of an extraction wiring portion II for gate bus line 218 formed on a TFT substrate 200 and the neighborhood of the same. FIG. 22 is a sectional view taken along the line A—A in FIG. 21. As shown in FIG. 21, a plurality of gate bus lines 218 formed in parallel in a display area I are bent at an angle at an extraction wiring portion II and are connected to respective connection terminals 462 at a terminal portion III. A repair line 460 is provided between the display area in the vicinity of the extraction wiring portion II and the terminal portion III.

The repair line 460 includes two lines intersecting the gate bus lines 218 on both sides of the display area I and terminal portion III as viewed from the surface of the TFT substrate 200, and those two lines are connected at the extraction wiring portion II. As shown in FIG. 22, the repair line 460 is in a multi-layer structure in which they are formed on the gate bus lines 218 on the TFT substrate 200 that is a glass substrate with gate insulation films 240 interposed therebetween and is electrically insulated from the drain bus lines 218. The repair line 460 is formed from the metal used to form drain bus lines 220 at the same time when the drain bus lines 220 are formed.

For example, when there is a breakage 464 in a certain gate bus line 218 at the extraction wiring portion II as shown in FIG. 21, intersecting regions 466 and 468 between the gate bus line 218 and the repair line 460 are irradiated with a laser beam to fuse the gate bus line 218 and repair line 460 together, thereby shorting them. Thus, a breakage in a gate bus line 218 at the extraction wiring portion II can be easily repaired.

As described above, the present mode for carrying out the invention makes it possible to a breakage in an extraction wiring portion, thereby allowing panels to be manufactured with improved yield. Further, the repair line which is newly provided does not increase the number of manufacturing steps because it is formed at the same step for forming drain bus lines 220 or gate bus lines 218.

A description will now be made with reference to FIGS. 23*a* through 29*b* on a display in a fourth mode for carrying out the invention and a method for repairing a defect in the same. In the present mode for carrying out the invention, a description will be made on a defect repairing method which is adapted to a breakage, short-circuit or the like in a line and an extraction wiring portion. Recently, liquid crystal panels are widely used as display devices of personal computers and personal digital assistants. There are increasing demands for cost reduction in the market, and improved yield is an urgent requirement in the field of manufacture. While a single or plurality of metal layers have been used for wiring at an extraction wiring portion II extending from a terminal portion III to a display region I as shown in FIG. 34 illustrating the related art, a line breakage can be caused by foreign substances entering at film forming steps to reduce the yield. The recent trend toward larger screens with higher fidelity has increased fine patterns in each of the bus lines, which has not only resulted in an increase in the probability of defects but also resulted in a situation in which even a redundant configuration encounters a difficulty in that a difference in line resistances during driving appears as a line defect.

The present mode for carrying out the invention is characterized in that auxiliary conductive thin film patterns in a partially or totally overlapping relationship with each other are formed as a wiring structure for an extraction wiring portion II that extends from a terminal portion III to a display area I of an LCD panel. The auxiliary conductive thin film patterns are electrically independent from each other or are electrically connected to each other through a contact hole at one end thereof. In a case of a breakage defect in the middle of the wiring at the extraction wiring portion II extending from the terminal portion III to the display area I, the detective line is irradiated with a laser beam to be connected to the auxiliary conductive thin film patterns, which makes it possible to relieve the line with a substantially negligible small difference in resistance from the other normal bus lines, thereby improving the manufacturing yield of liquid crystal panels.

The present mode for carrying out the invention will be described with reference to embodiments. In the present mode for carrying out the invention, components having the same functions and operations as those in the first, second and third modes for carrying out the invention will be indicated by like reference numbers and will not be described.

A first embodiment will now be described.

Figure 23A:
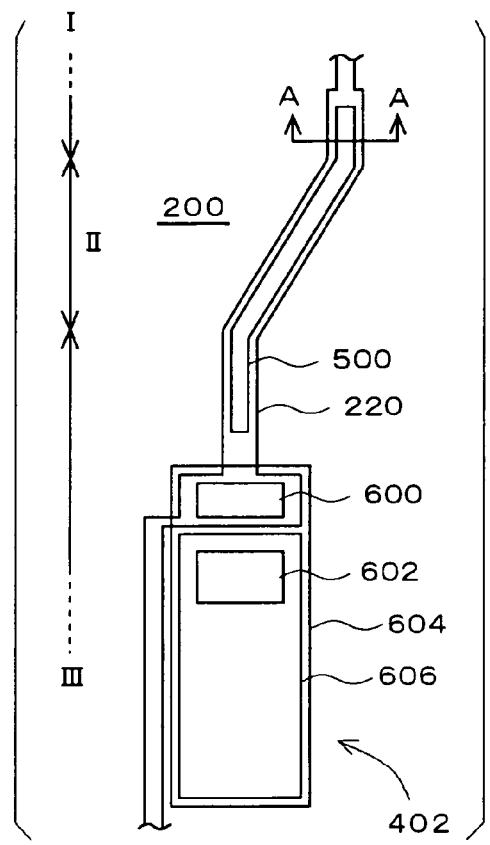
FIGS. 23a, 23b, and 23c schematically illustrate a first embodiment of a method for repairing a defect in a display in a fourth mode for carrying out the invention.
Figure 23C:
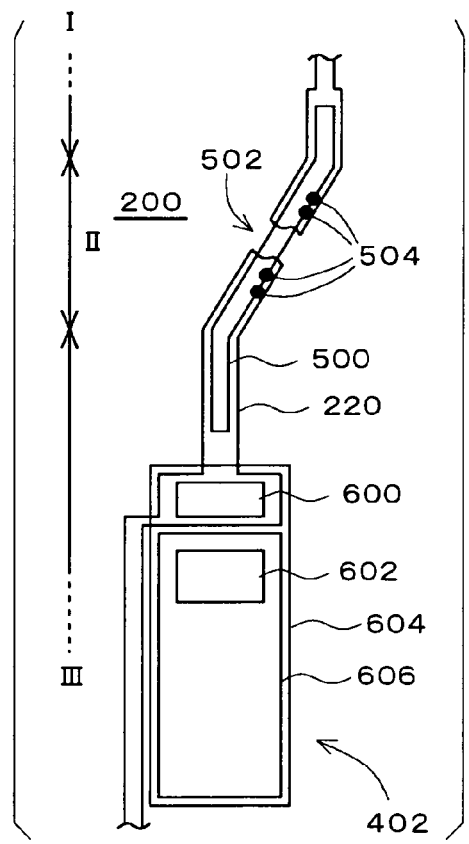
Figure 23B:
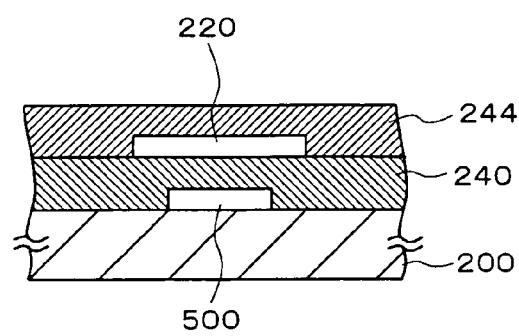

FIG. 23*a* shows a part of an extraction wiring portion II for drain bus lines 220 formed on a TFT substrate 200 and the neighborhood of the same. FIG. 23*b* is a sectional view taken along the line A—A in FIG. 23*a*. As shown in FIGS. 23*a*, 23*b* and 23*c*, a plurality of drain bus lines 220 (FIG. 23*a* shows only one of them) formed in parallel in a display area I are bent at an angle at an extraction wiring portion II and are connected to respective external connection terminals 402 at a terminal portion III.

At the external connection terminal 402 for a drain bus line 220, the drain bus line 220 which is a second metal layer is extended to a position immediately before the terminal and is connected and switched to a pad 606 which is a first metal layer through contact holes 600 and 602 in an ITO film 604. The drain bus line 220 is wired and routed only in the second metal layer, and the first metal layer does not interfere the same. It is therefore possible to form the first metal layer as auxiliary line 500 under the drain bus lines 220 which is the second metal layer.

As shown in FIG. 23*b*, the auxiliary line 500 is formed from the same metal as that used to form the gate bus lines on the TFT substrate 200 which is a glass substrate at the same time when the gate bus lines 218 are formed. The auxiliary line 500 forms a multi-layer structure in combination with the drain bus lines 220 with a gate insulation film interposed therebetween, and it is electrically insulated from the drain bus lines 220 and is in an electrically floating state in which it does not work as it is.

In the present embodiment, the auxiliary line 500 is formed under all of the drain bus lines 220 at the extraction wiring portion II. As shown in FIG. 23*c*, when a drain bus line 220 is broken due to a foreign substance that has stuck thereto during a film forming step or a photolithographic step, there has been no way other than discarding the panel as defective according to the related art. In the present embodiment, however, since the auxiliary line 500 is provided under the same, the two positions 504 for laser irradiation on both sides of a broken position 502 of the broken drain bus line 220 are irradiated with a laser beam to fuse the drain bus line 220 and the auxiliary line 500 together, thereby shorting them. Thus, a breakage in a drain bus line 220 at the extraction wiring portion II can be easily repaired.

The above-described configuration and method for repairing a defect can be equally applied to an extraction wiring portion II for gate bus lines 218. In this case, the gate bus lines 218 correspond to the first metal layer, and the auxiliary line 500 corresponds to the second metal layer.

A second embodiment will now be described.

Figure 24A:
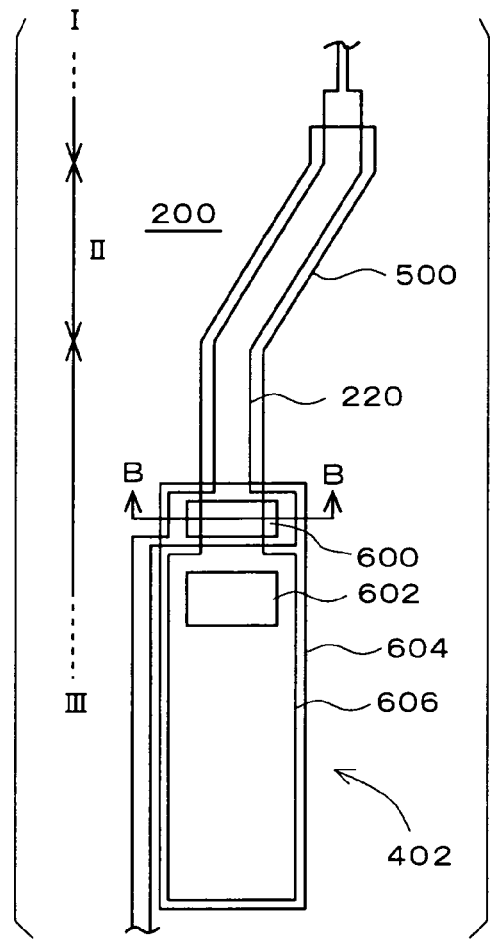
FIGS. 24a, 24b and 24c schematically illustrate a second embodiment of a method for repairing a defect in a display in the fourth mode for carrying out the invention.
Figure 24C:
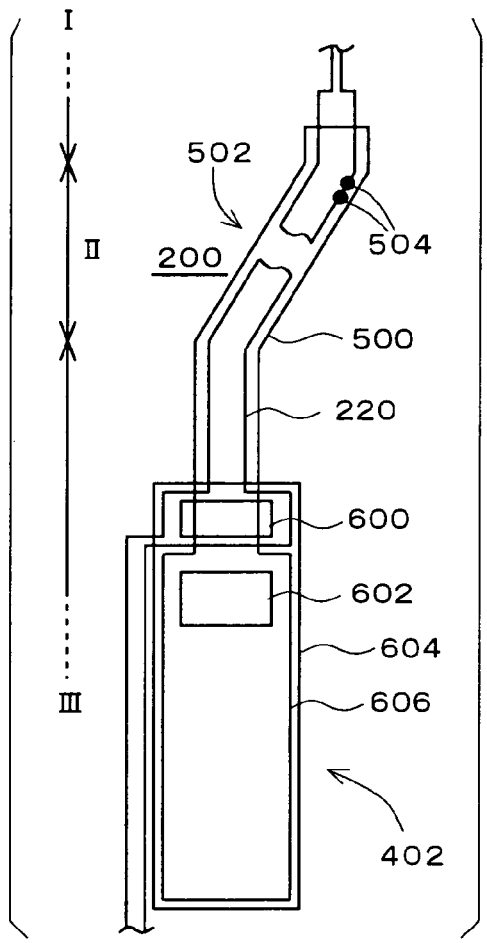
Figure 24B:
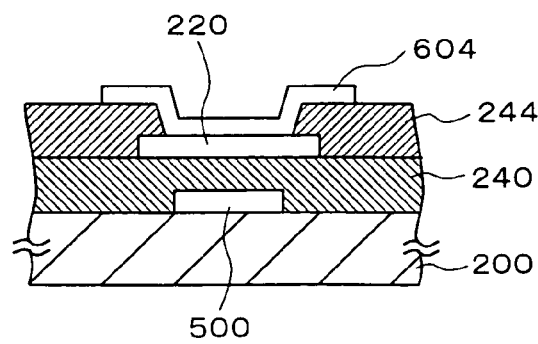

FIG. 24*a* shows a part of an extraction wiring portion II for drain bus lines 220 formed on a TFT substrate 200 and the neighborhood of the same. FIG. 24*b* is a sectional view taken along the line B—B in FIG. 24*a*. While the structure shown in FIGS. 24*a*, 24*b* and 24*c* has the same basic configuration as that shown in FIGS. 23*a*, 23*b* and 23*c*, it is characterized in that one end of an auxiliary line 500 is connected to drain bus lines 220 in advance. Specifically, as shown in FIGS. 24*a* and 24*b*, at an external connection terminal 402 for a drain bus line 220, the drain bus line 220 which is a second metal layer is extended to a position immediately before the terminal and is connected through contact holes 600 and 602 in an ITO film 604 to a pad 606 which is a first metal layer. One end of the auxiliary line 500 is connected to the pad 606.

Therefore, while the broken portion 502 must be irradiated with a laser beam on both sides thereof in the configuration shown in FIGS. 23*a*, 23*b* and 23*c*, a broken line can be relieved by irradiating only one position 504 for laser irradiation on the side of the display area with a laser beam to establish connection. This makes it possible to reduce the number of steps for a repair operation significantly. Since connection is established only at a broken portion, it is possible to suppress the difference in resistance from a normal bus line. While contact between a drain bus line 220 and the auxiliary line 500 is established on the side of the terminal portion III in the present embodiment, the contact may be established at the end of the line on the side of the display area I.

A third embodiment will now be described.

Figure 25A:
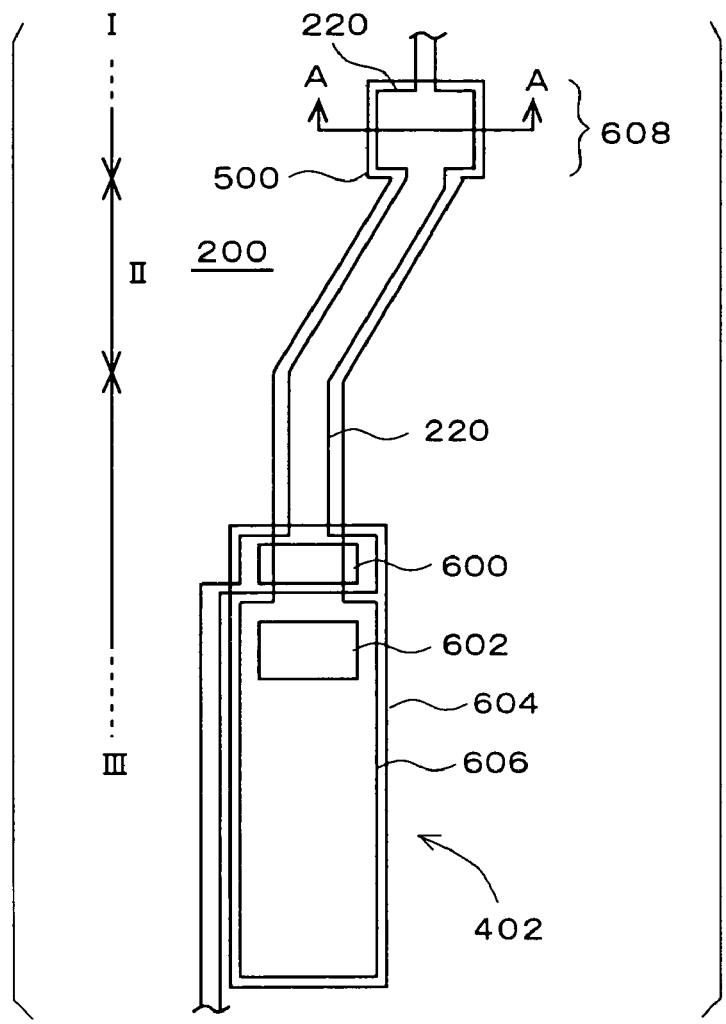
FIGS. 25a and 25b schematically illustrate a third embodiment of a method for repairing a defect in a display in the fourth mode for carrying out the invention.
Figure 25B:
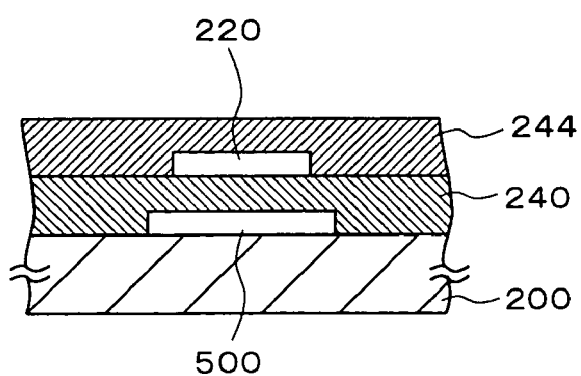

FIG. 25a shows a part of an extraction wiring portion II for drain bus lines 220 formed on a TFT substrate 200 and the neighborhood of the same. FIG. 25b is a sectional view taken along the line A—A in FIG. 25a. The present embodiment relates to an improvement in operability during irradiation with a laser, and the configuration of the embodiment itself is the same as that shown in FIGS. 24a, 24b and 24c. When an end of the auxiliary line 500 is irradiated with a laser, there is a possibility that the auxiliary line 500 itself may be erroneously cut because the auxiliary line 500 has a small width. In the present embodiment, a part of a line to be irradiated with a laser is expanded to provide a pad 608, which eliminates the possibility of cutting of the line itself to improve operability during a repair. The purpose of providing the pad 608 instead of making the entire line thicker is to minimize the possibility of the occurrence of a short-circuit between the line and any pattern adjacent thereto and to avoid any increase of the load attributable to parasitic capacitance between the bus lines and a common electrode.

A fourth embodiment will now be described.

Figure 26A:
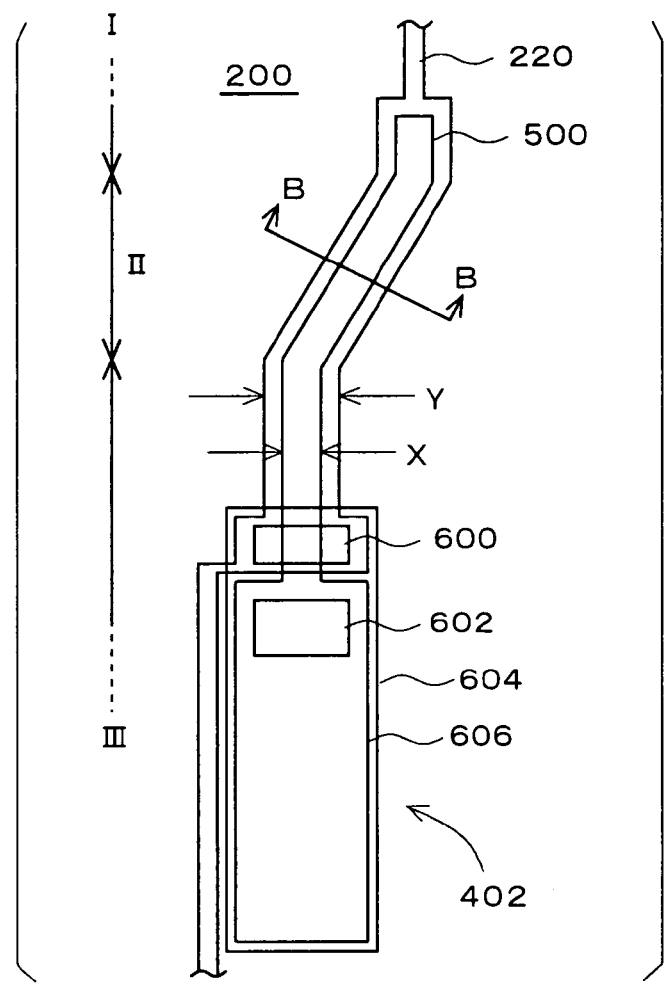
FIGS. 26a and 26b schematically illustrate a fourth embodiment of a method for repairing a defect in a display in the fourth mode for carrying out the invention.
Figure 26B:
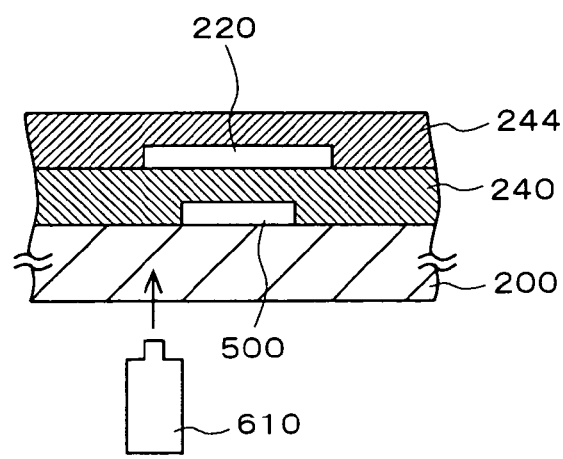

FIG. 26a shows a part of an extraction wiring portion II for drain bus lines 220 formed on a TFT substrate 200 and the neighborhood of the same. FIG. 26b is a sectional view taken along the line B—B in FIG. 26a. The present embodiment relates to an improvement of operability during irradiation with a laser, and the configuration of the embodiment itself is the same as that shown in FIGS. 24a, 24b and 24c. The present embodiment is characterized in that lines in the first metal layer closer to the TFT substrate 200 which is a glass substrate are formed with a width X somewhat smaller than the Y of lines in the second metal layer.

When a breakage defect of a line at a terminal is repaired after the panel is completed, the bottom surface of the TFT substrate 200 on which a TFT array is provided is irradiated generally with a laser beam from a repairing laser 610 as shown in FIG. 26b. This is because laser irradiation of the side of the substrate has a problem in that the field of the laser can be blocked by a BM (black matrix) and in that the intensity of the laser beam is likely to be decreased by obstacles such as liquid crystals.

At this time, while an end of the line is irradiated with the laser in order to prevent the line from being broken by mistake, repairing accuracy can be deduced when the width X of auxiliary line 500 constituted by the first metal layer is greater than the width Y of drain bus lines 220 constituted by the second metal layer because the position irradiated by the laser beam can not be visually confirmed. Although it is convenient if the auxiliary line 500 and the drain bus lines 220 have the same width, it is difficult to implement because of the problem of residual metals after etching. The rate of successful connection during a repair can be improved by forming the lines in the first metal layer with a width X somewhat smaller than the width Y of the lines in the second metal layer.

A fifth embodiment will now be described.

Figure 27:
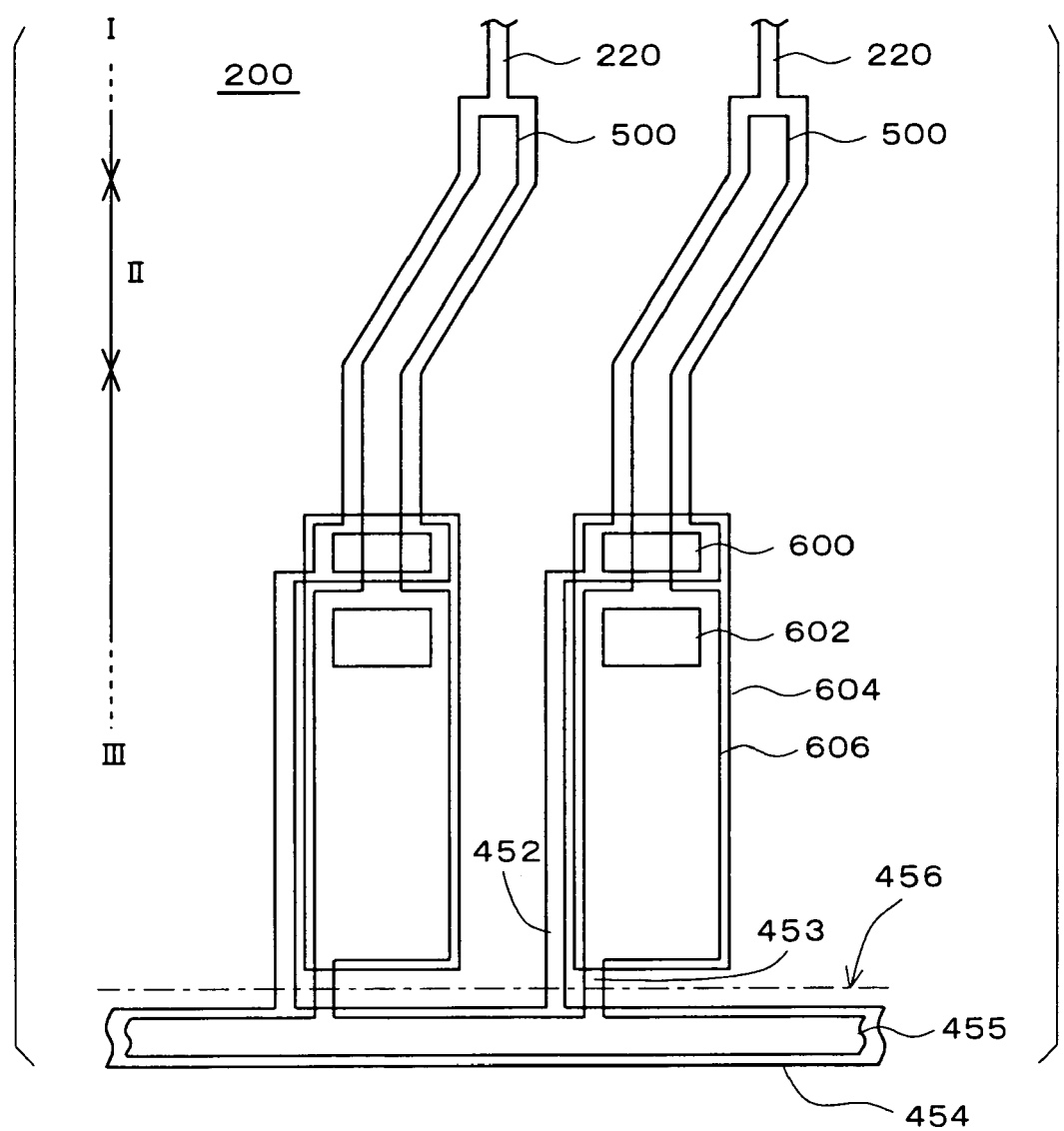
FIG. 27 schematically illustrates a fifth embodiment of a method for repairing a defect in a display in the fourth mode for carrying out the invention.

As shown in FIG. 27, the present embodiment is characterized in that drain bus lines 220 and auxiliary line 500 are connected through connecting lines 452 and 453 to short rings 454 and 455 provided to prevent electrostatic faults. It is empirically known that an electrically floating pattern is vulnerable to electrostatic breakdown during processing, and the breakage of such a pattern can be prevented by connecting the same to a short ring to release locally generated electrical charges. Even when static electricity is generated during array processing for forming elements on a TFT substrate 200, such an arrangement makes it possible to prevent a short-circuit attributable to electrostatic breakdown from occurring at an intersection between a drain bus line 220 and the auxiliary line 500. When the panel is complete, since the short rings 454 and 455 are cut at a scribe line 456 to be removed, the drain bus line 220 and the auxiliary line 500 are electrically isolated.

A sixth embodiment will now be described.

Figure 28A:
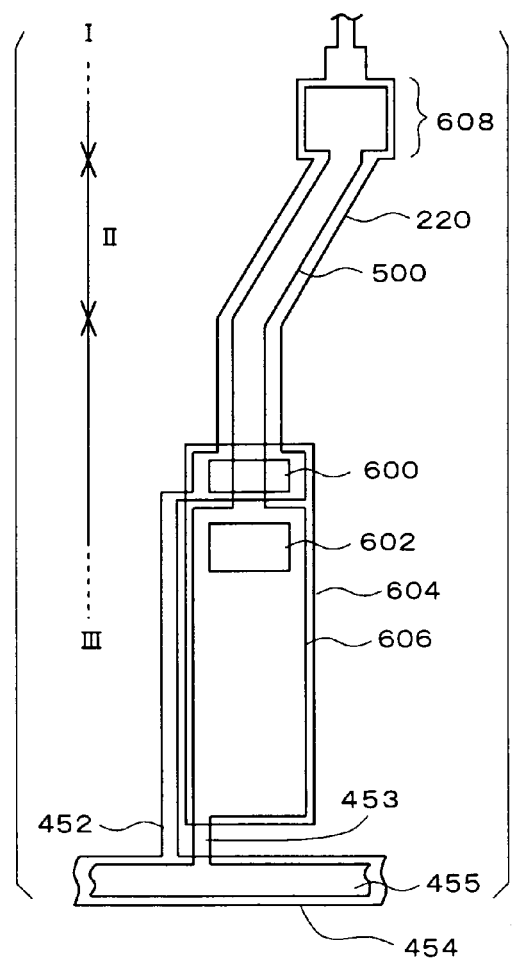
FIGS. 28a and 28b schematically illustrate a sixth embodiment of a method for repairing a defect in a display in the fourth mode for carrying out the invention.
Figure 28B:
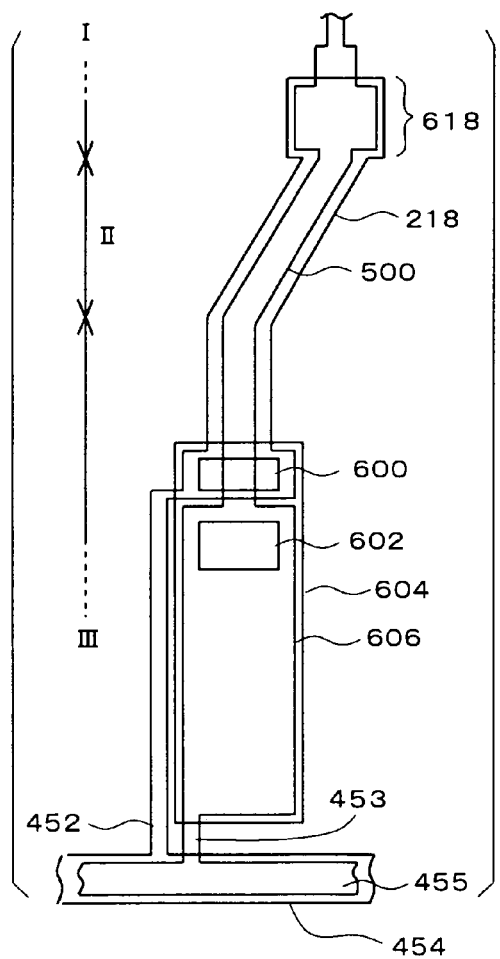

FIGS. 28a and 28b show a configuration which is a combination of the above-described first through fifth embodiments in the present mode for carrying out the invention. FIG. 28a shows an area around an extraction wiring portion for drain bus lines 220. FIG. 28b shows an area around an extraction wiring portion for gate bus lines 218.

Terminals for the drain bus lines 220 and gate bus lines 218 have different structures because those lines are provided in separate layers unless they are relocated. Although the terminals shown in FIGS. 28a and 28b have different routings, since redundant wiring is provided, the terminals for the drain bus lines 220 and gate bus lines 218 have substantially the same structure except for the layer configuration of the auxiliary line 500. This structure is advantageous not only in that a redundant structure to cope with a line breakage can be provided for both of the drain bus lines 220 and gate bus lines 218 but also in that substantially the same design rules can be used for the terminals.

A seventh embodiment will now be described.

Figure 29A:
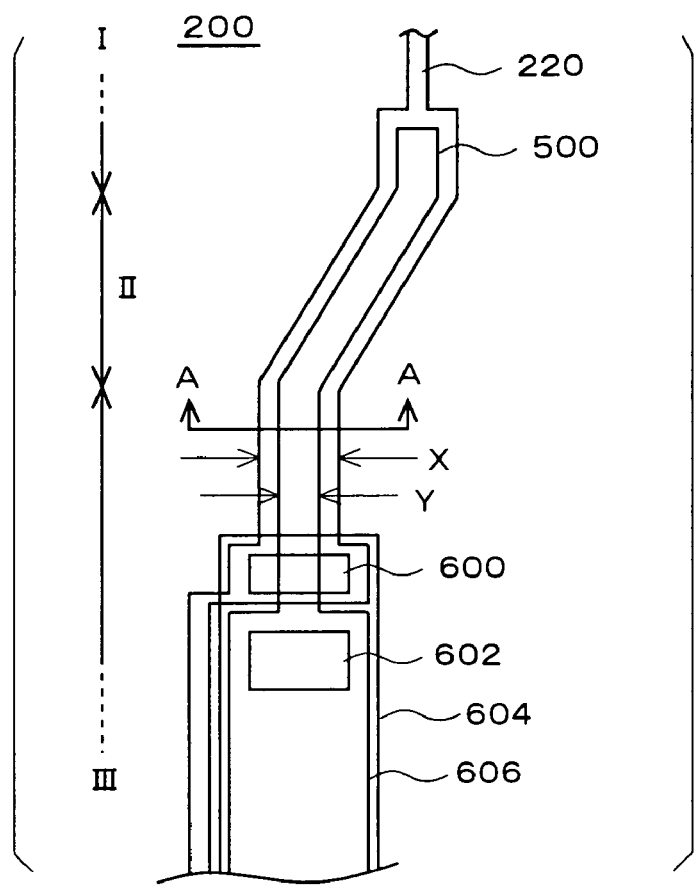
FIGS. 29a and 29b schematically illustrate a seventh embodiment of a method for repairing a defect in a display in the fourth mode for carrying out the invention.
Figure 29B:
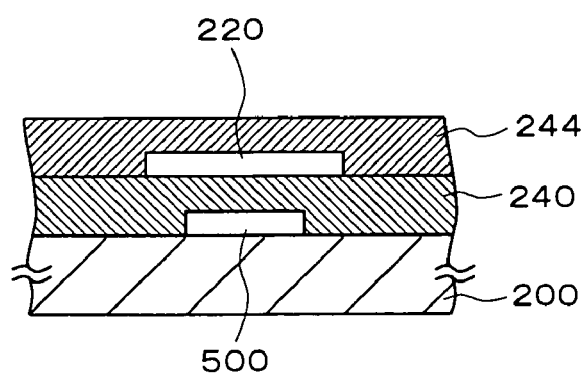
Figure 30:
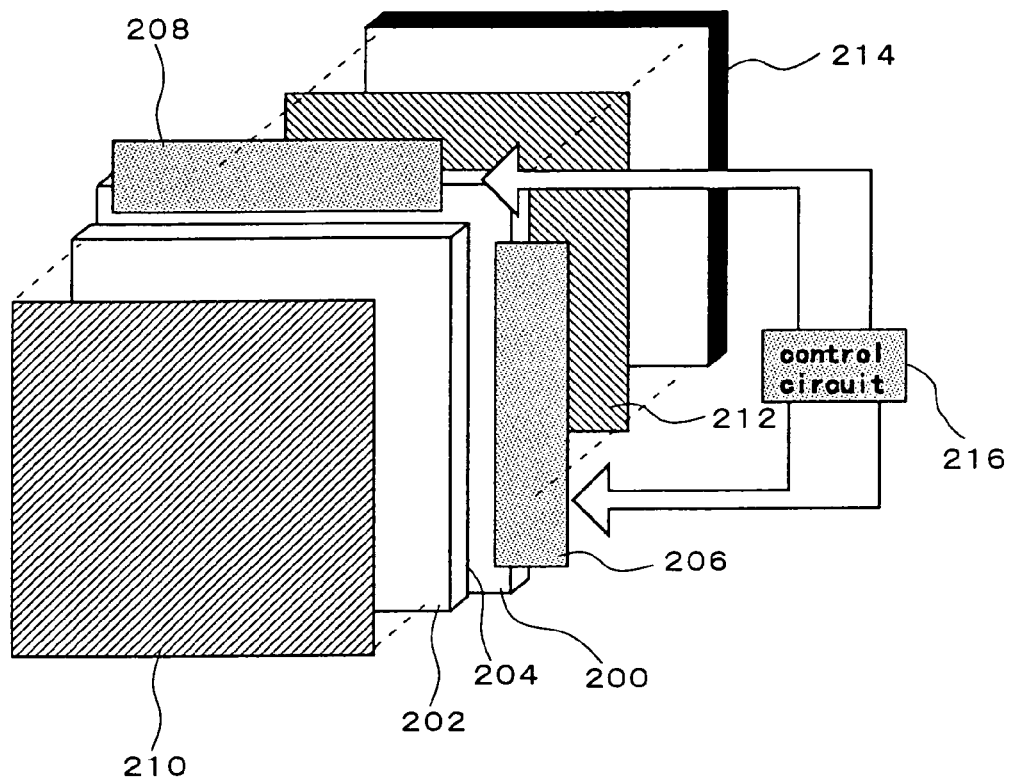
FIG. 30 illustrates a schematic configuration of a liquid crystal display.
Figure 31:
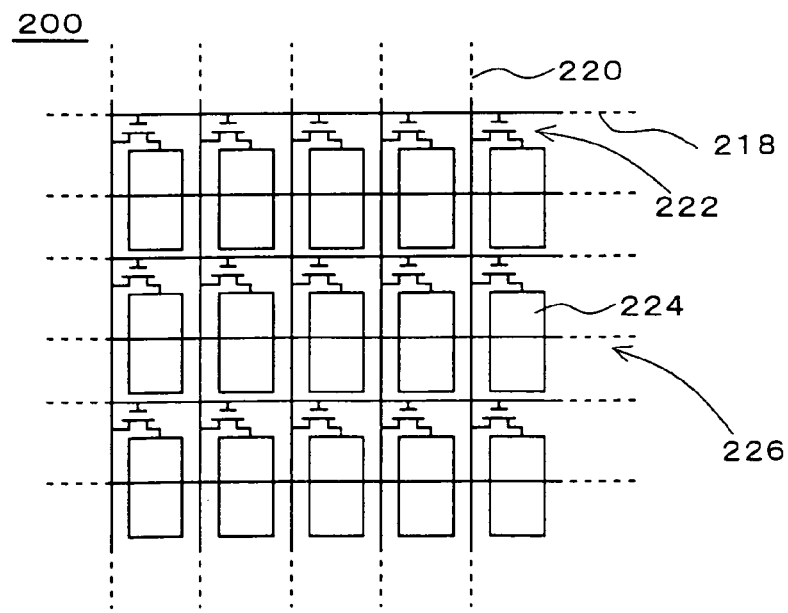
FIG. 31 illustrates a schematic configuration of an element portion of a liquid crystal display.

The description of the present embodiment will refer to a more specific structure with reference to FIGS. 29a and 29b. FIG. 29a shows an extraction wiring portion II for drain bus lines 220 formed on a TFT substrate 200 and the neighborhood of the same. FIG. 29b is a sectional view taken along the line A—A in FIG. 29a.

Referring to the materials for the bus lines in the present embodiment, gate bus lines 218 are formed of Al/MoN/Mo, and drain bus lines 220 are formed of MoN/Al/MoN/Mo. Both of those lines have a thickness of 200 nm that contributes to resistance if their thickness is considered in terms of the thickness of the Al film having a low resistance as a conductor as a reference, and both of them have a sheet resistance of about 0.2 $\Omega/\square$. Therefore, those lines have the same resistance if they have the same width. For example, in the case of a 21-inch LCD panel of the SXGA class (1280×1024 lines), since the line width is about 20 μm, the resistance of the same including the display area is on the order of 15 K$\Omega$. While the auxiliary line 500 has a similar sheet resistance, such a resistance causes no fluctuation of the resistance of normal lines because the auxiliary line 500 does not contribute to electrical conduction.

Connection established by means of irradiation with a laser beams results in a contact resistance on the order of 0.2 $\Omega$ which is a negligible magnitude when the resistance of the panel as a whole is considered. Referring to effects of fluctuations of such resistances on display, it has been empirically confirmed that a line resistance distribution of 5% or less does not appear as a line defect on a panel as described above. In the case of a breakage defect in a part of a bus line, the bus line has a resistance with an infinite magnitude because it is broken. In this case, a laser-based repair operation is performed to connect the auxiliary line 500 such that the broken part can be bypassed. Even if this results in a change in the distance from the terminal portion of the bus line to the portion connected as a result of the laser-based repair, no change occurs in the line resistance because those lines have the same resistance.

Therefore, even when replacement is performed at a line breakage repairing operation, substantially no change occurs in the voltage drop that a pixel signal on the line undergoes before it reaches the display area because the replaced line and the properly operating part having substantially the same resistance. Thus, a line which has been connected using a laser will not appear as a defect. Further, the same effect can be expected also when wiring materials having different resistances are used by limiting the resistance difference to a small value through the adjustment of the thicknesses and widths of the lines.

As described above, the present mode for carrying out the invention makes it possible to relieve a line breakage defect at an extraction wiring portion extending from a terminal portion to a display area of a liquid crystal panel without any significant process change, thereby improving manufactrung yield.

Specifically, when a breakage is caused in a bus line pattern by a foreign substance or the like that has stuck thereto, the panel is normally discarded as a defective. With the present configuration, however, the function of the line can be recovered by connecting a metal line in another layer using a laser. Further, since the present configuration is not affected by the number of line breakage defects, a plurality of line breakage defects can be repaired to relieve a defective panel.

The auxiliary line 500 has no influence on normal bus lines, and only a broken bus line is connected through irradiation with a laser. Therefore, only one route is formed as the current path of the line. Thus, there is substantially no difference in resistance between the repaired portion and properly working portion of the bus line, and no light line defect appears by the resistance difference. Further, a repair operation involves only a small number of steps because connection using a laser is required at only one connecting portion for one broken line.

Boundaries between lines can be visually recognized by forming the lower metal layer smaller than the upper metal layer, which is advantageous in that a repair operation is facilitated and in that a repair can be performed in the middle of a line. By providing an original wiring pattern and a wiring pattern for repair with substantially the same resistance, the difference in resistance between bus lines during a repair can be limited to a small value, which increases the margin of display quality.

Further, when the auxiliary line 500 which is a wiring pattern for repair is formed as an independent pattern, while the pattern becomes more vulnerable to a breakage due to static electricity at manufacturing steps, the occurrence of a defect as a result of the provision of this pattern can be advantageously avoided by connecting it to a common connection pattern (short ring) which is provided on a mother glass outside the panel through a terminal to protect the bus line wiring and the auxiliary line 500 from electrostatic breakdown during processing of the panel.

The present invention is not limited to the above-described modes for carrying out the same, and various modifications may be made.

For example, while the above-described modes for carrying out the invention have been described with reference to an active matrix liquid crystal display utilizing TFTs as switching elements as an example, the present invention is not limited thereto and may be applied to various other displays such as active matrix liquid crystal displays utilizing non-linear elements such as diode elements (MIM), passive type liquid crystal displays, EL (electro-luminescence) displays and PDPs (plasma displays) and methods for repairing defects in them.

As described above, the present invention makes it possible to provide a display and a defect repairing method in which defects such as inter-layer short-circuits and short-circuits in a single layer that have occurred at steps for manufacturing the display can be easily repaired with high probability to provide a good product.

What is claimed is:

1. A display having a plurality of bus lines formed in a display area, comprising:

said plurality of bus lines each being defined by three segments, a display area segment, an extraction wiring portion segment, and a terminal portion segment, where said extraction wiring portion segment is positioned between said display area segment and said terminal portion segment; and a repair line connectable to a plurality of extraction lines, at said display area segments and said terminal portion segments, but not at said extraction wiring portion segments, said repair line being configured for repairing a line breakage that has occurred in at least one of said extraction wiring portion segments.

* * * * *